(12) United States Patent
Mitchell

(10) Patent No.: US 9,777,763 B2
(45) Date of Patent: Oct. 3, 2017

(54) HOOK WITH MAGNETIC CLOSURE

(71) Applicant: Lucy A. Mitchell, Melksham Wiltshire (GB)

(72) Inventor: Lucy A. Mitchell, Melksham Wiltshire (GB)

( * ) Notice: Subject to any disclaimer, the term of this patent is extended or adjusted under 35 U.S.C. 154(b) by 131 days.

(21) Appl. No.: 14/708,541

(22) Filed: May 11, 2015

(65) Prior Publication Data

US 2015/0322996 A1     Nov. 12, 2015

Related U.S. Application Data

(63) Continuation-in-part of application No. 13/947,588, filed on Jul. 22, 2013, now Pat. No. 9,032,594, which
(Continued)

(51) Int. Cl.

| | |
|---|---|
| *F16B 45/02* | (2006.01) |
| *F16B 45/04* | (2006.01) |
| *F16B 1/00* | (2006.01) |
| *A44C 5/20* | (2006.01) |
| *H01F 7/02* | (2006.01) |

(52) U.S. Cl.
CPC ............ *F16B 45/02* (2013.01); *A44C 5/2038* (2013.01); *F16B 1/00* (2013.01); *F16B 45/04* (2013.01); *H01F 7/0263* (2013.01); *A44D 2203/00* (2013.01); *F16B 2001/0035* (2013.01); *Y10T 24/32* (2015.01); *Y10T 24/4533* (2015.01); *Y10T 24/45435* (2015.01)

(58) Field of Classification Search
CPC .. F16B 45/02; F16B 1/00; F16B 45/04; F16B 2001/0035; A44C 5/2038; A44D 2203/00; H01F 7/0263; Y10T 24/45435; Y10T 24/4533; Y10T 24/32
See application file for complete search history.

(56) References Cited

U.S. PATENT DOCUMENTS 1,545,377 A * 7/1925 Westmoreland .......... B66C 1/36
                                                                             24/599.1
1,985,596 A * 12/1934 Burnham ................ F16B 45/02
                                                                             24/599.5

(Continued)

FOREIGN PATENT DOCUMENTS

| JP | 05286296 | 11/1993 |
|---|---|---|
| JP | 09184509 | 7/1997 |

*Primary Examiner* — Robert J Sandy
*Assistant Examiner* — Louis Mercado
(74) *Attorney, Agent, or Firm* — Simpson & Simpson, PLLC

(57) ABSTRACT

A hook formed into a body formed into a hook shape and having a neck and fabricated from nonferromagnetic material with the body having a first end and a second end. The neck is proximate the first end. One side of the neck includes a center ridge with a flat top surface with either a magnet or ferromagnetic material embedded in the center ridge. The hook also includes a closure having a first closure end and a second closure end and a channel with a floor flanked by two lateral sides. A second magnet or a ferromagnetic material is embedded into the floor opposed to the first magnet or ferromagnetic material. The closure being pivotally and/or pivotally and slidably attached to the hook body by at least one pin. The magnet(s) and/or ferromagnetic material hold the closure in a closed position enclosing a defined space.

16 Claims, 29 Drawing Sheets

Related U.S. Application Data is a continuation-in-part of application No. 13/596,616, filed on Aug. 28, 2012, now Pat. No. 9,080,595, which is a continuation-in-part of application No. 12/881,744, filed on Sep. 14, 2010, now Pat. No. 8,448,307.

(56) References Cited

U.S. PATENT DOCUMENTS

| | | | |
|---|---|---|---|
| 3,097,406 A | 7/1963 | Yarborough | |
| 3,317,972 A * | 5/1967 | Harley | B64D 17/30 220/2.1 A |
| 3,577,583 A * | 5/1971 | Amann | B42F 1/02 16/87.2 |
| 3,629,905 A | 12/1971 | Cote | |
| 3,861,007 A * | 1/1975 | Silverman | F16B 45/04 24/600.6 |
| 4,152,814 A * | 5/1979 | Ito | F16B 45/02 24/599.3 |
| 4,401,333 A * | 8/1983 | Merry | F16B 45/02 24/600.2 |
| 4,922,645 A | 5/1990 | Hannon et al. | |
| 5,438,736 A * | 8/1995 | Terada | F16B 45/02 24/265 H |
| 6,360,408 B1 * | 3/2002 | Dykstra | F16B 45/04 24/115 G |
| 7,059,023 B1 * | 6/2006 | Wu | F16B 45/00 24/370 |
| 7,131,616 B2 * | 11/2006 | Livingstone | F16B 45/00 248/206.5 |
| 7,441,424 B2 | 10/2008 | Saitoh et al. | |
| 7,636,990 B1 * | 12/2009 | Choate | F16B 45/02 24/600.1 |
| 7,757,360 B1 * | 7/2010 | Hong | F16B 45/02 24/599.5 |
| 8,001,663 B2 * | 8/2011 | Belcourt | F16B 45/02 24/599.5 |
| 9,206,836 B2 * | 12/2015 | DeBien | F16B 45/02 |
| 2005/0283953 A1 | 12/2005 | Jeffrey | |
| 2007/0209168 A1 | 9/2007 | Dietz | |
| 2007/0214616 A1 * | 9/2007 | Peterson | F16B 45/02 24/599.1 |
| 2008/0222859 A1 | 9/2008 | Chepurny et al. | |
| 2008/0250615 A1 * | 10/2008 | Emenheiser | F16B 45/02 24/599.5 |
| 2009/0193631 A1 * | 8/2009 | Liu | A45C 13/18 24/458 |
| 2011/0138587 A1 * | 6/2011 | Walker | F16B 45/02 24/599.5 |

* cited by examiner

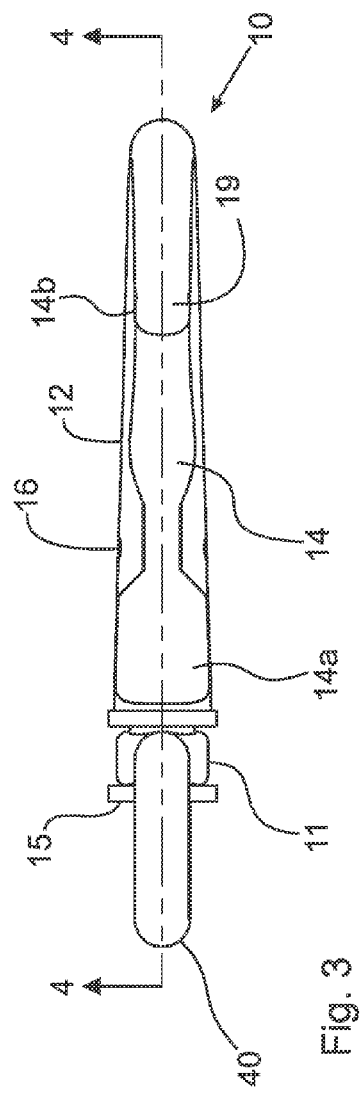
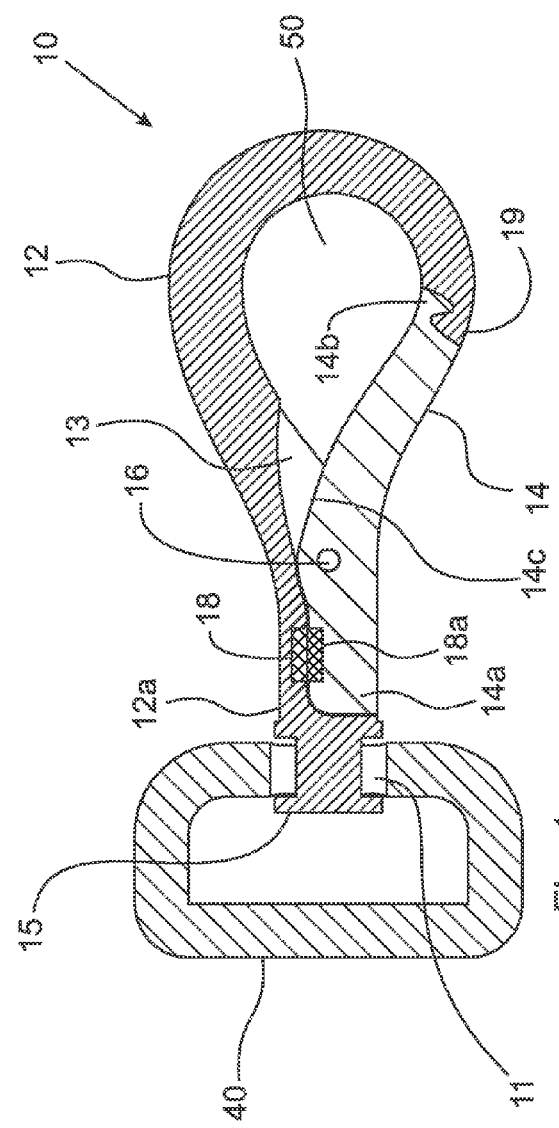
Fig. 3
Fig. 4

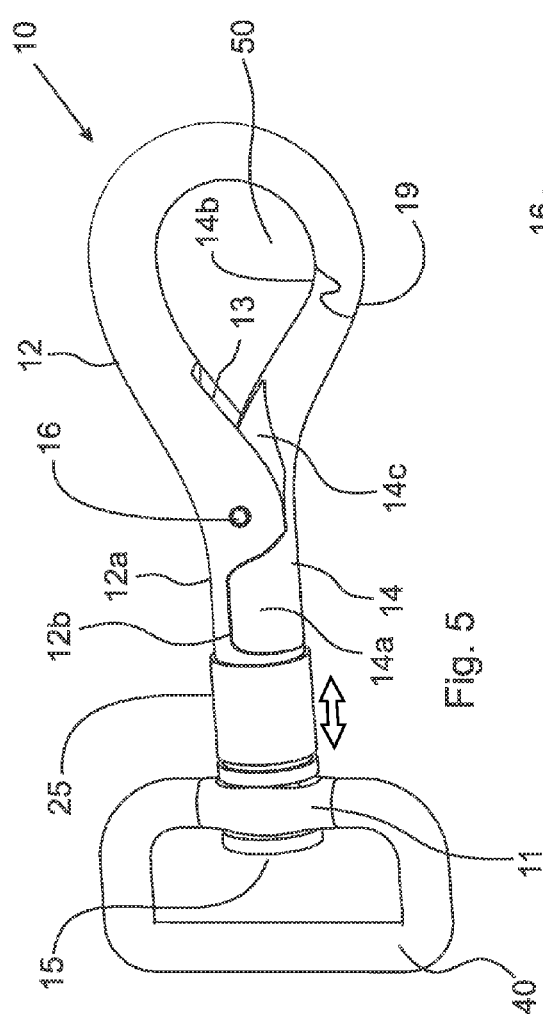
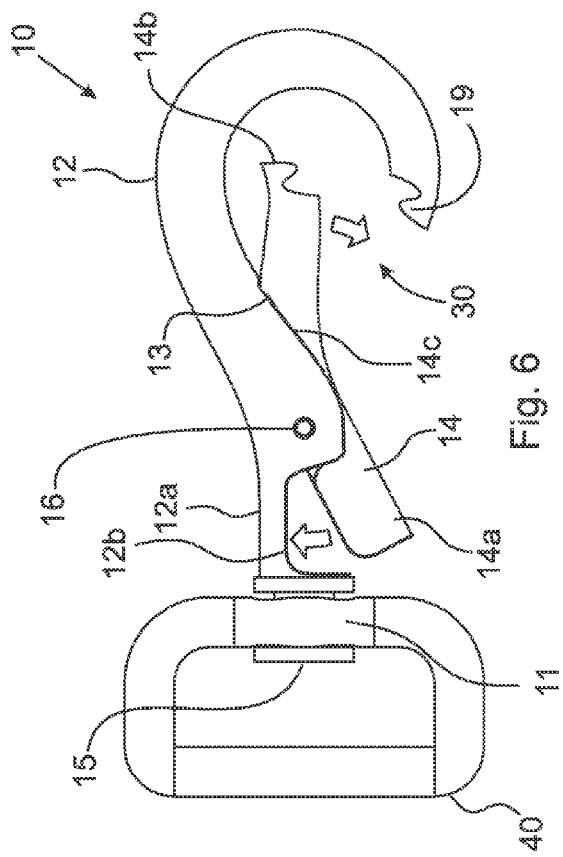

HOOK WITH MAGNETIC CLOSURE

CROSS REFERENCE TO RELATED APPLICATIONS

This application is filed under 35 U.S.C. §120 as a continuation-in-part of U.S. patent application Ser. No. 13/947,588, now U.S. Pat. No. 9,032,594, filed Jul. 22, 2013, which application claims priority under 35 U.S.C. §120 as a continuation-in-part to U.S. patent application Ser. No. 13/596,616, now U.S. Pat. No. 9,080,595, filed Aug. 28, 2012, which application claims priority under 35 U.S.C. §120 as a continuation-in-part of U.S. patent application Ser. No. 12/881,744, now U.S. Pat. No. 8,448,307, filed Sep. 14, 2010, which applications are incorporated herein by reference in their entireties.

FIELD OF THE INVENTION

The present invention relates generally to the field of hooks and clasps, specifically to hooks and clasps with a closing mechanism, and more specifically to closures that are manually operated.

BACKGROUND OF THE INVENTION

Manually operated hooks or clasps are found in the prior art that operate using a spring that holds the hook closure closed when the spring is extended. When springs are extended they exert little or no force, meaning that the hook closure is held closed with little or no force. This makes it relatively easy to slightly open the closure to enable the hooked item to slip off the hook. When the closure is opened more completely, the spring exerts progressively more force making the closure harder to open as the spring is compressed. Thus, in prior art hooks of this type, it is harder to purposely open the hook to attach or secure something than it is to accidentally lose something off the hook.

The prior art design tends to cause injuries in that the compressed spring can snap forward unexpectedly injuring the user. In addition, the protruding knob used to pull and hold open the spring is often uncomfortable or even painful to operate.

U.S. Pat. No. 7,441,424 to Saitoh, et al. discloses a clamp that opens similar to a scissors with two arms connected by an off-center pivot pin. The two opposing long arms include a pin to hold a security tag or materials while each of the two short arms includes a magnet of opposing polarity which together hold the clamp in the closed position. The clamp has the disadvantage of not securing an item on the arm and not enabling secure movement of the secured item when the disclosed clamp is closed.

U.S. Patent Application Publication No. 2007/0209168 to Dietz teaches a magnetic spring clip that is attached to an instrument such as a pen or penlight. However, the clip requires that a magnet be in the instrument that is held by the clip thereby introducing a limitation to its usefulness in that nonmagnetic devices cannot be securely held by the clip.

U.S. Patent Application Publication No. 2008/0250615 to Emenheiser teaches a retainer apparatus in the form of a modified hook having a closure that is held in the open position by a magnet. The retainer includes a biasing device to move the closure into the closed position. The Emenheiser retainer requires a trigger to activate the biasing device which, similar to other prior art discussed above, has reduced force to keep the retainer in the closed position. In addition, the use of a trigger mechanism increases the possibility of injury caused by the inadvertent activation of the biasing trigger.

In addition, as mentioned above, the clasps and hooks currently in the field are easily opened accidentally because of the lack of positive force holding the closure in the closed position. The main impediment to overcoming this deficiency is devising a simple structure that not only provides positive closing force to the closure, but can still be easily opened without excessive force and require a minimum number of parts.

Thus, it can be seen there is a need in the field for a hook closure that is easily opened, utilizes a positive force to hold a clasp or hook in the closed position around a hook type of device, and prevents or reduces accidental opening of the clasp or hook.

SUMMARY OF THE INVENTION

The present invention broadly comprises a hook comprising: a body having a neck and formed into a hook shape and fabricated from nonferromagnetic material with the body having a first end and a second end. The neck is proximate the first end. The hook also comprises a closure having a first closure end and a second closure end that is fabricated from nonmagnetic ferromagnetic material, the closure being centrally pivotally attached to the body and positioned to span a space between the second end of the hook and the body. There is at least one magnet fixedly attached to the neck, wherein the at least one magnet holds the closure in a closed position that spans the gap such that the hook encloses a defined space in the closed position.

In an alternate embodiment, the present invention broadly comprises a body having a neck and formed into a hook shape and fabricated from nonferromagnetic material, the body having a first end and a second end wherein the neck is proximate to the first end; a pin centrally attached to the body; a closure having a first closure end and a second closure end and fabricated from nonmagnetic ferromagnetic material, the closure having a slot and pivotally and slidably attached to the pin and positioned to span a space between the second end and the body in a closed position; a neck groove formed in the neck to receive the first closure end and including a groove wall proximate the first body end; a lip extending from the body and facing the neck groove, the lip maintaining the closure in the closed position; at least one neck magnet fixedly attached to the neck groove; and, at least one closure magnet fixedly attached to the closure proximate the first closure end. The at least one neck magnet and the at least one closure magnet are offset from each other and possess opposite polarity and hold the closure in the closed position. The hook encloses a defined area in the closed position.

In a second alternate embodiment the present invention broadly comprises a hook comprising: a body formed into a hook shape and fabricated from nonferromagnetic material, the body having a first hook end and a second hook end, a neck, and an angled portion in which the neck is proximate to the first hook end; a center ridge extending along one side of the neck, one end of the center ridge forming a flange that reaches to the angled portion, with the center ridge having a flat top surface and an angled slot is defined by the flange and has two legs. The hook also includes comprises a closure having a first closure end and a second closure end and a first lateral side and a second lateral side, each lateral side extending the length of the closure; a channel having a floor and extending at least partly between the lengths of the first lateral side and the second lateral side. at least one pin rotatably attached to the first and second lateral sides; a bridge proximate to the second closure end and attached to the first and second lateral sides. A first magnet is attached to either the top surface of the center ridge proximate to the first hook end or the floor of the channel proximate the first closure end. The at least one pin is slidably engaged with the slot; and the hook encloses a defined area in a closed position. Preferably the hook includes a second magnet positioned opposite the first magnet.

The hook encloses a defined area in the closed position.

One object of the invention is to provide a hook that uses magnetic force to keep the closure in a closed position.

A second object of the invention is to replace a biasing spring to hold a closure in place with a magnetically closed closure.

A third object of the invention is to provide a hook that is safe to use and easy to open.

Another object is to demonstrate a hook that is safer to use than the prior art.

An additional object of the invention is to provide a hook in which the closing force is becomes stronger as the closure approaches the closed position.

A further object is to supply a locking mechanism for the hook.

A still further object of the invention is to offer a hook devised to decrease or prevent accidental openings while simultaneously configured to open easily.

An additional object of the invention is to supply a hook configured to include features that provide stability while the hook is held in the open position.

BRIEF DESCRIPTION OF THE SEVERAL VIEWS OF THE DRAWINGS

The nature and mode of the operation of the present invention will now be more fully described in the following detailed description of the invention taken with the accompanying drawing Figures, in which:

FIG. 3 is a bottom view of the hook showing the closure in the closed position;

FIG. 4 is a cross section of the hook taken along line 4-4 of FIG. 3;

FIG. 5 is a bottom perspective of the present invention depicting the receiving groove formed into the body of the hook;

FIG. 6 is a side view of the hook demonstrating the closure in the open position forming a space between the second end of the hook and the body of the hook;

FIG. 24 depicts hook 300 in the closed position;

FIGS. 25 and 25A show the first movement of the closure during the opening of the hook;

FIGS. 26 and 26A portray the position of the closure relative to the hook when the first pin reaches the end of the long slot leg;

FIGS. 27 and 27A depict the rotational movement of the closure relative to the hook body when the bridge is moved out of the j-hook; and, FIGS. 28 and 28A depict the position of the closure relative to the hook body when the closure is completely opened.

DETAILED DESCRIPTION OF EMBODIMENTS OF THE INVENTION

At the outset, it should be appreciated that like drawing numbers on different drawing views identify identical structural elements of the invention. It also should be appreciated that figure proportions and angles are not always to scale in order to clearly portray the attributes of the present invention.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. Although any methods, devices or materials similar or equivalent to those described herein can be used in the practice or testing of the invention, the preferred methods, devices, and materials are now described. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
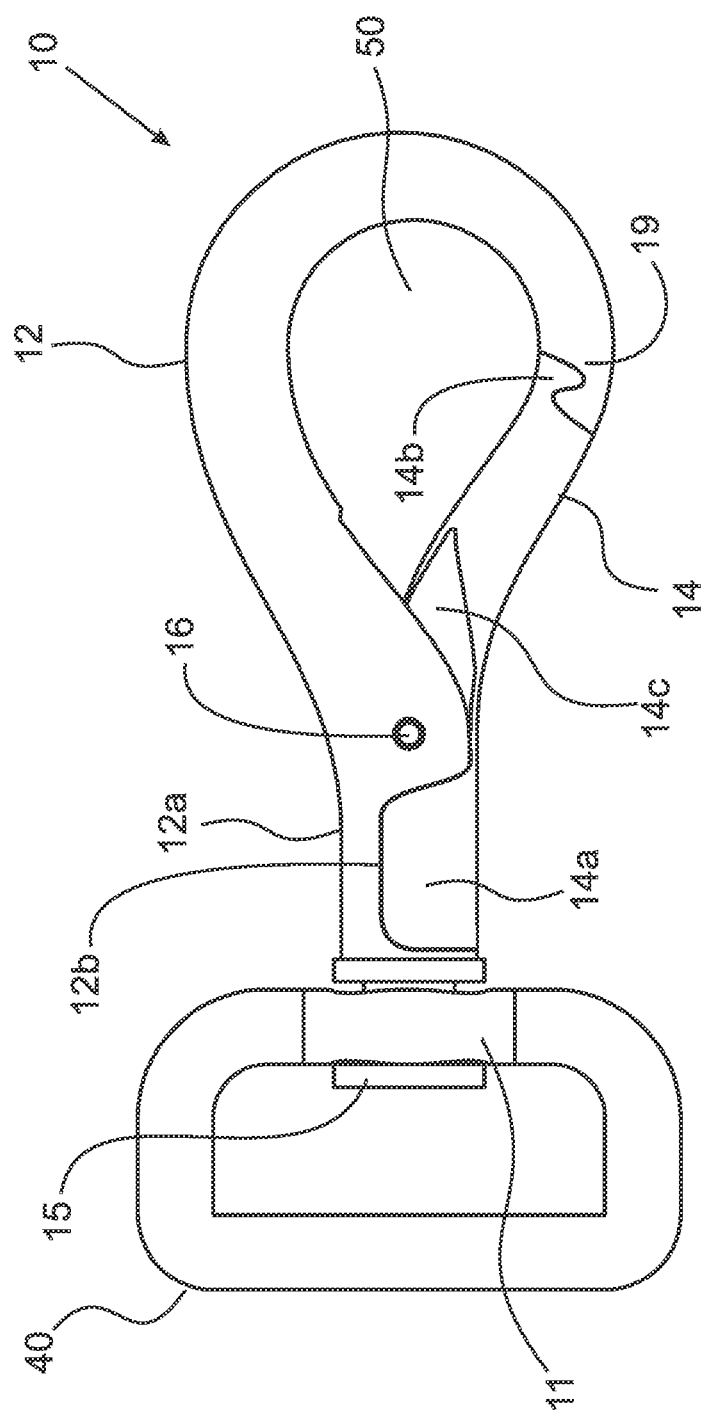
FIG. 1 is a side view of the hook of the present invention.

Adverting to the drawings, FIG. 1 is a side view of hook 10. Hook 10 is attached to ring 40 by attachment 11. Attachment 11 is shown as a swivel attachment that allows hook 10 to move through an arc. Persons of ordinary skill in the art will recognize that other types of attachments 11 are suitable to hold ring 40 to hook 10. Examples of such attachments include, but are not limited to, pivot attachments as with ball and socket attachments and solid attachments. Examples of ring 40 include, but are not limited to, o-rings, d-rings, chain attachments, handles, etc.

First end 15 of hook 10 is attached to attachment 11. Neck 12a extends from first end 15 and is preferably integral with body 12. By integral is meant that the component parts are formed together as a single unit. Preferably, hook 12 is fabricated from nonferromagnetic material. By ferromagnetic is meant material that it is attracted to magnets. Therefore, the term "nonferromagnetic" describes material that is not attracted to magnets. Body 12 is shaped into a hook having second end 19 at the end of the hook. Body 12 is shown as having a curved shape. It will be recognized that body 12 may have a straight body shape between neck 12a and the curved portion of the hook forming a j-shaped hook.

Closure 14 is pivotally attached to body 12 using pivot 16 and is preferably fabricated from nonmagnetic ferromagnetic material. Pivotal attachment 16 enables closure 14 to open and close by rotating on pivot 16. Pivot attachment 16 is substantially in the center of closure 14. When closure 14 is in the closed position, it spans the space between second end 19 and body 12 of hook 10. In a preferred embodiment, second closure end 14b and second end 19 are each configured to form a mating type fit an example of which is seen in FIG. 1.

Figure 2:
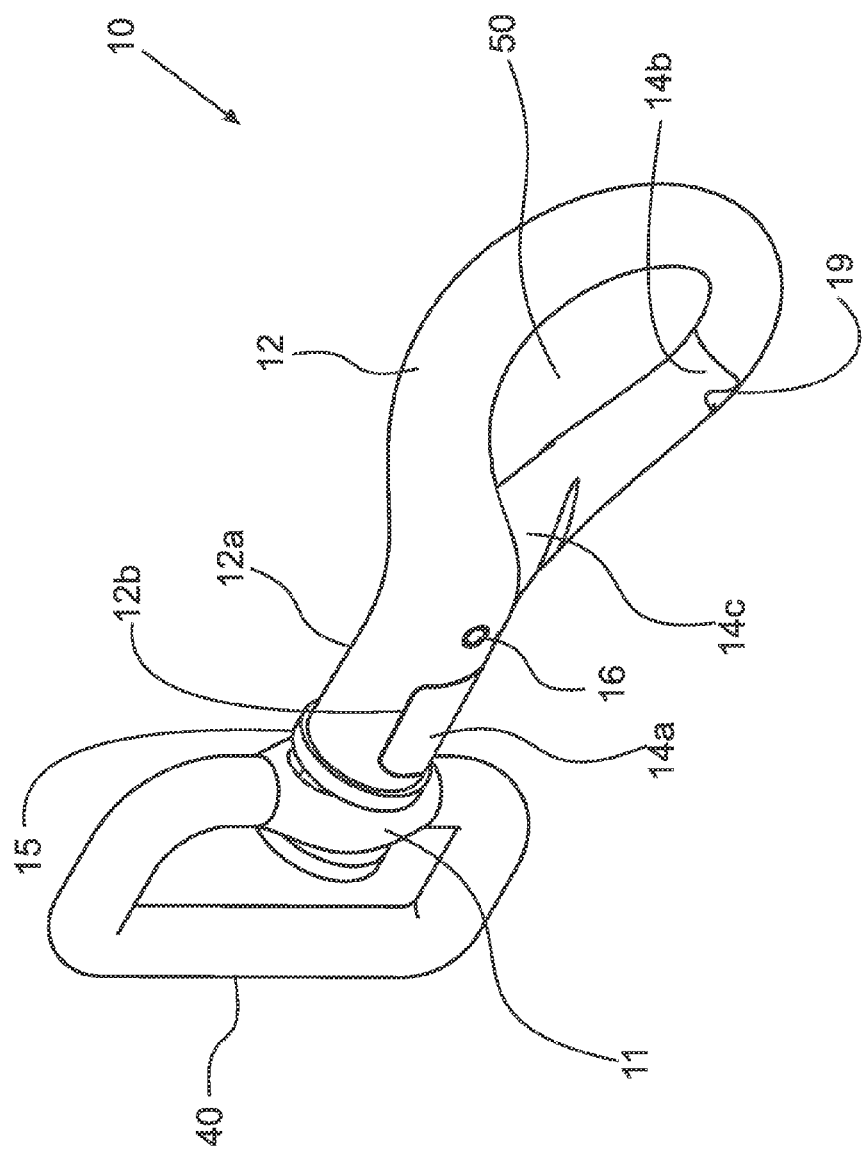
FIG. 2 is a side perspective view of the hook of the present invention.

In a preferred embodiment shown in FIG. 1, body 12 and neck 12a are formed to receive closure 14 in both the open and closed positions, respectively. Neck 12 is formed to include neck groove 12b which receives first closure end 14a when closure 14 is moved to the closed position extending to second end 19 of hook 10 to decrease the size of neck 12a. In the open position, receiving groove 13 in body 12 (not seen in FIG. 1) receives closure 14 when it is rotated away from second end 19 through space 50 to body 12. Preferably, closure 14 includes region 14c which contacts receiving groove 13 when closure 14 is opened. Preferably, region 14c is formed, for example flattened, to matingly fit into receiving groove 13 to increase the size of space 50 when closure 14 is opened. The size will be increased as a reduced volume of closure 14 will extend into space 50 in the open position. FIG. 2 is a side perspective view of hook 10 showing more clearly region 14c.

FIG. 3 is a bottom view of hook 10 showing closure 14 in the closed position. FIG. 4 is a cross section taken along line 4-4 of FIG. 3. Neck magnet 18 is seen fixedly attached to neck 12a, preferably so as to have a surface exposed in neck groove 12b. While the manner of fixed attachment shown in FIG. 4 is embedding, it will be recognized that other forms of fixed attachment may be used, such as, but not limited to, adhesives and press fit or friction fit into a recess. FIG. 4 also depicts an alternate embodiment in which closure magnet 18a is embedded so as to be exposed on the surface of first closure end 14a opposite neck magnet 18. In this embodiment, magnet 18a will be of the opposite polarity of magnet 18 thereby providing increased attractive magnetic force holding closure 14 in the closed position. Preferably, the strength of neck magnet 18 and/or closure magnet 18a are such as to enable a user to open closure 14 using one or two fingers. It will be recognized that one or more magnets may be positioned in either neck groove 12b or at first closure end 12a. In alternate embodiments, a single magnet 18 may be used without magnet 18a or magnet 18a may be used without magnet 18. Also seen is receiving groove 13 in body 12.

FIG. 5 is a bottom perspective view of hook 10 in the closed position showing receiving groove 13 formed into body 12. Also seen is an alternate embodiment in which collar 25 is placed on hook 10 so as to enable it to slide over neck 12a and first closure end 14a. By sliding over and enclosing neck 12a and first closure end 14a, closure 14 is locked by preventing it from rotating around pivot 16 to the open position. The double arrow shows the axial sliding direction of collar 25 on neck 12a. In one embodiment, collar 25 is fabricated from ferromagnetic material which allows it to be held in the locking position by one or both of magnets 18 and 18a.

Figure 7A:
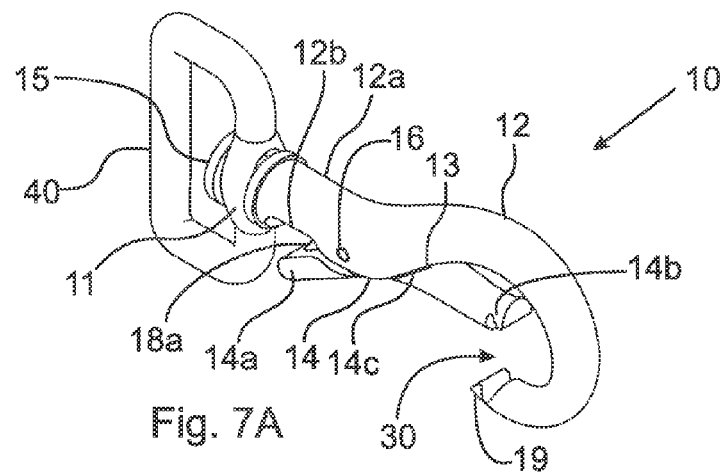
FIG. 7A is a top perspective view of the hook in the open position.
Figure 7B:
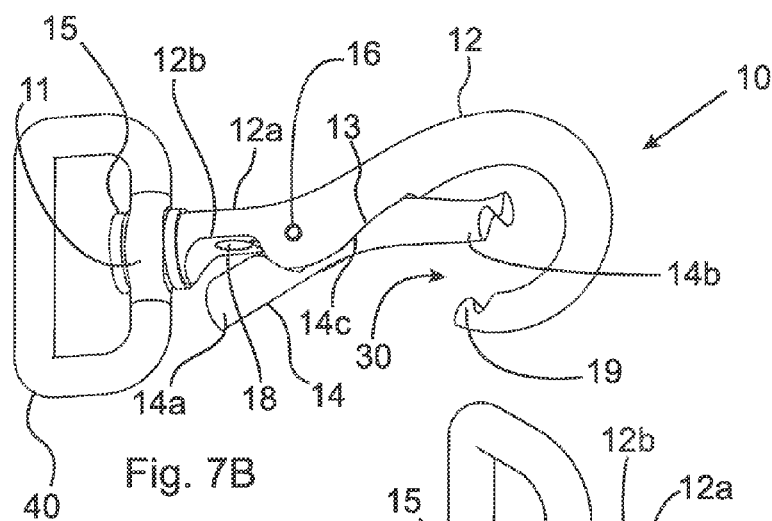
FIG. 7B is a side perspective view of the hook in the open position.

FIG. 6 is a side view of hook 10 demonstrating closure 14 in the open position. In the open position, closure 14 is rotated away from second end 19 to form space 30 between second end 19 and body 12. In the embodiment shown, region 14c is seen fitting into receiving groove 13. The arrows show the movement of each end of closure 14 from the open to the closed position. FIGS. 7A and 7B are top perspective and side perspective views, respectively, of hook 10 in the open position. FIG. 7A depicts the embodiment that includes magnet 18a fixedly attached to first closure end 14a. FIG. 7B shows magnet 18 in neck 12a with its surface exposed at neck groove 12b.

Figure 8:
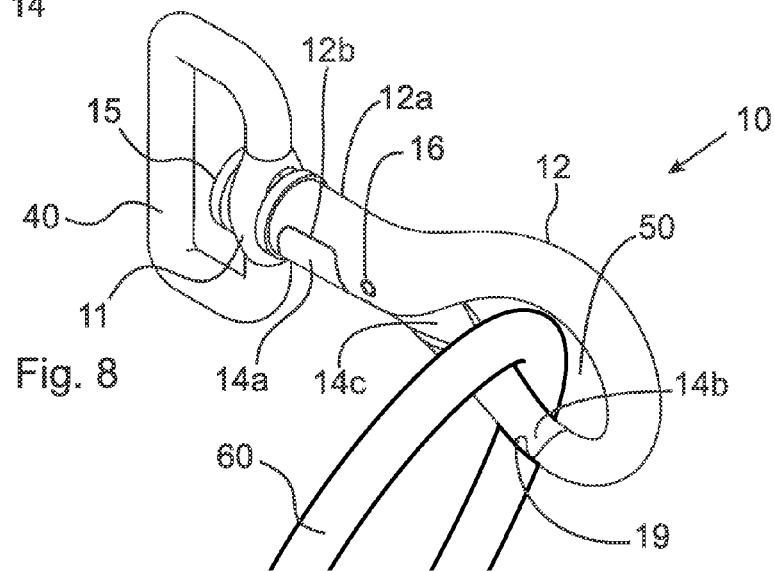
FIG. 8 is a top perspective view of the hook of the present invention securing a loop with the closure in the closed position.

FIG. 8 is a top perspective view of hook 10 demonstrating the advantage of the magnetic closure 14. Loop 60 is enclosed by closed hook 10 within area 50. Although not seen in FIG. 8, persons of skill in the art will recognize that loop 60 is tied off to form a closed loop that prevents it from sliding out of area 50. It can be seen that any force pulling loop 60 against closure 14 will actually apply additional rotational closing force against ferromagnetic closure 14 driving it toward neck groove 12a and neck magnet 18. It can also be seen that the arrangement of using force to hold closure 14 in the closed position provides an advantage over the prior art as it helps to prevent an item held by hook 10 ("hooked item") from slipping out of area 50 as opposed to a closure held in place by an axial spring as in the prior art which is easily opened.

Hook 10 is opened to receive a loop or other item by pushing closure 14 so as to rotate second closure end 14b into enclosed area 50. Magnet 18 can be sized to allow first closure end 14a to be released easily by pushing with a finger. In contrast to spring-biased hook closures, the more closure 14 is pushed into area 50, the easier it is to continue pushing because ferromagnetic first closure end 14a is moved further from neck magnet 18. The same principle applies if closure magnet 18a, located in first closure end 14a, is used with neck magnet 18 or alone. In addition, there is little snap or sudden closing of closure 14 as found in prior art hooks with biasing springs as the magnetic force only gradually increases as first closure end 14a approaches magnet 18. The distance for a sudden closing is limited to 2-3 mm.

Figure 9:
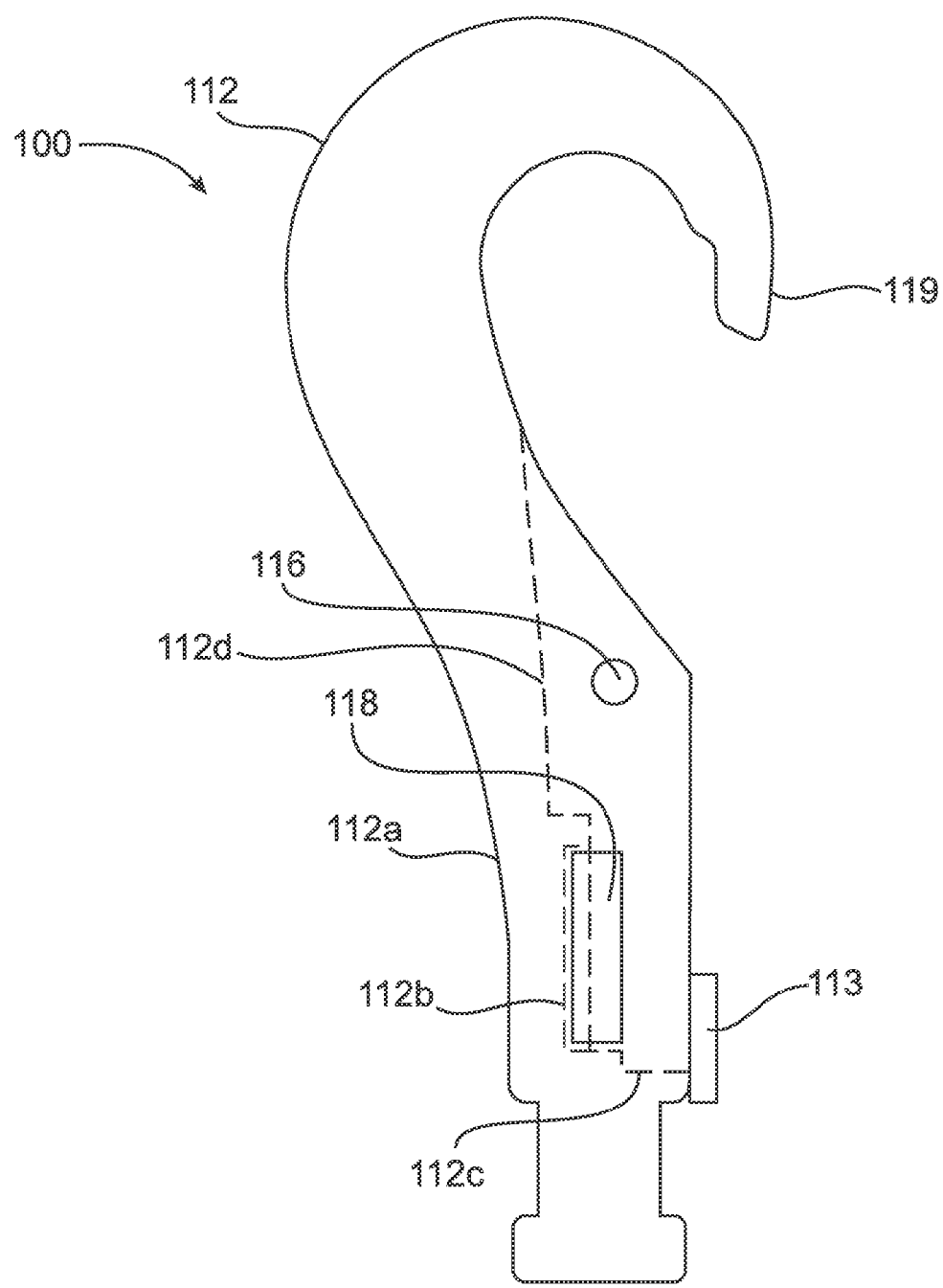
FIG. 9 is a side view of a second embodiment of the hook of the present invention without a closure and including a lip opposite the neck groove.

FIG. 9 is a side view of hook 100 without a closure and including a lip opposite the neck groove of a second embodiment of the present invention. Hook 100 includes body 112, neck 112a proximate first body end 112e, and second body end 119.

Also seen in shaded view is neck groove 112b including groove wall 112c and lip 113 opposing neck groove 112b. As seen in FIG. 9, neck groove 112b may extend into an inner surface of body 112 to form receiving groove 112d for closure 114 (not seen in FIG. 9) in the open position. Alternatively, receiving groove 112d may be a separate groove. A receiving magnet may optionally be located in receiving groove 112d. Lip 113 may preferably be integral with body 112 or attached with screws, rivets, adhesives in methods known to those having skill in the art. By integral is meant that the component parts are formed together as a single unit. Pivot 116 extends through body 112. In a one embodiment, pivot pin 116 ("pin 116") is circular, meaning its cross section does forms a circle. In shaded view, neck magnet 118 is seen embedded in neck groove 112b. In one embodiment, neck magnet 118 is approximately 10 mm long, 3 mm wide, and 2 mm deep, however, persons having skill in the art will recognize that the size of magnet 118 can be changed depending on the size of hook 100 and the magnetic force desired. Similar to hook 10 described above, a ring may be attached to hook 100 using a swivel attachment that allows hook 100 to move through an arc. Persons of ordinary skill in the art will recognize that other types of attachments are suitable to hold the ring to hook 100. Example of such attachments include, but are not limited to, pivot attachments as with ball and socket attachments and solid attachments. Examples of rings include, but are not limited to, o-rings, d-rings, chain attachments, handles, etc.

Figure 10A:
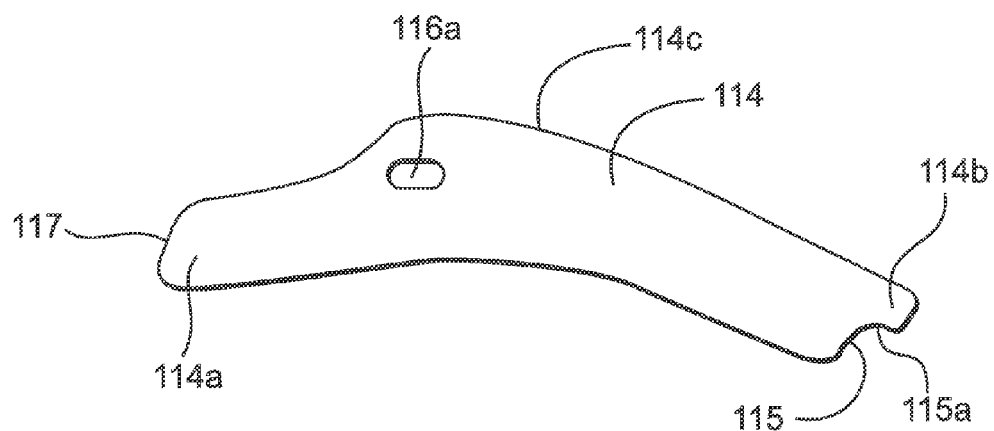
FIG. 10A is a side view of one embodiment of the closure of the hook seen in FIG. 9 in which the pivot slot is oval-shaped.
Figure 10B:
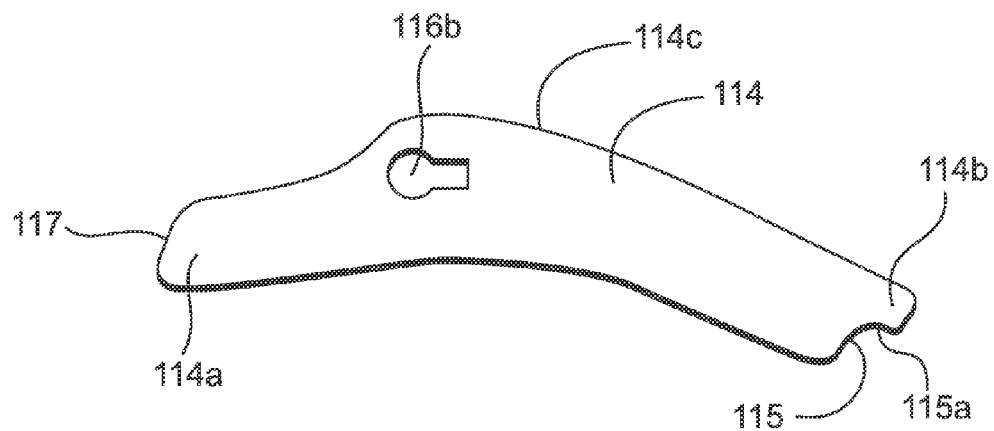
FIG. 10B is a side view of an alternate embodiment of the closure in which the slot is keyhole shaped.

FIG. 10A is a side view of one embodiment of closure 114. First closure end 114a and second closure end 114b are on longitudinally opposite ends of closure 114. Edge 117 is formed from first closure end 114a. In one embodiment, offset 115 is formed from a portion of second closure end 114b which includes extension 115a. Region 114c contacts an inner surface of body 112 when closure 114 is opened. In a preferred embodiment, region 114c is received into receiving groove 112d when closure 114 is opened. Closure 114 defines slot 116a which is pivotally attached to pin 116. In the embodiment shown, slot 116a has an oval shape. FIG. 10B is a side view of an alternate embodiment of closure 114 in which slot 116b is keyhole shaped. Preferably, closure 114 is fabricated from nonmagnetic material, more preferably, nonmagnetized ferromagnetic material.

Figure 11:
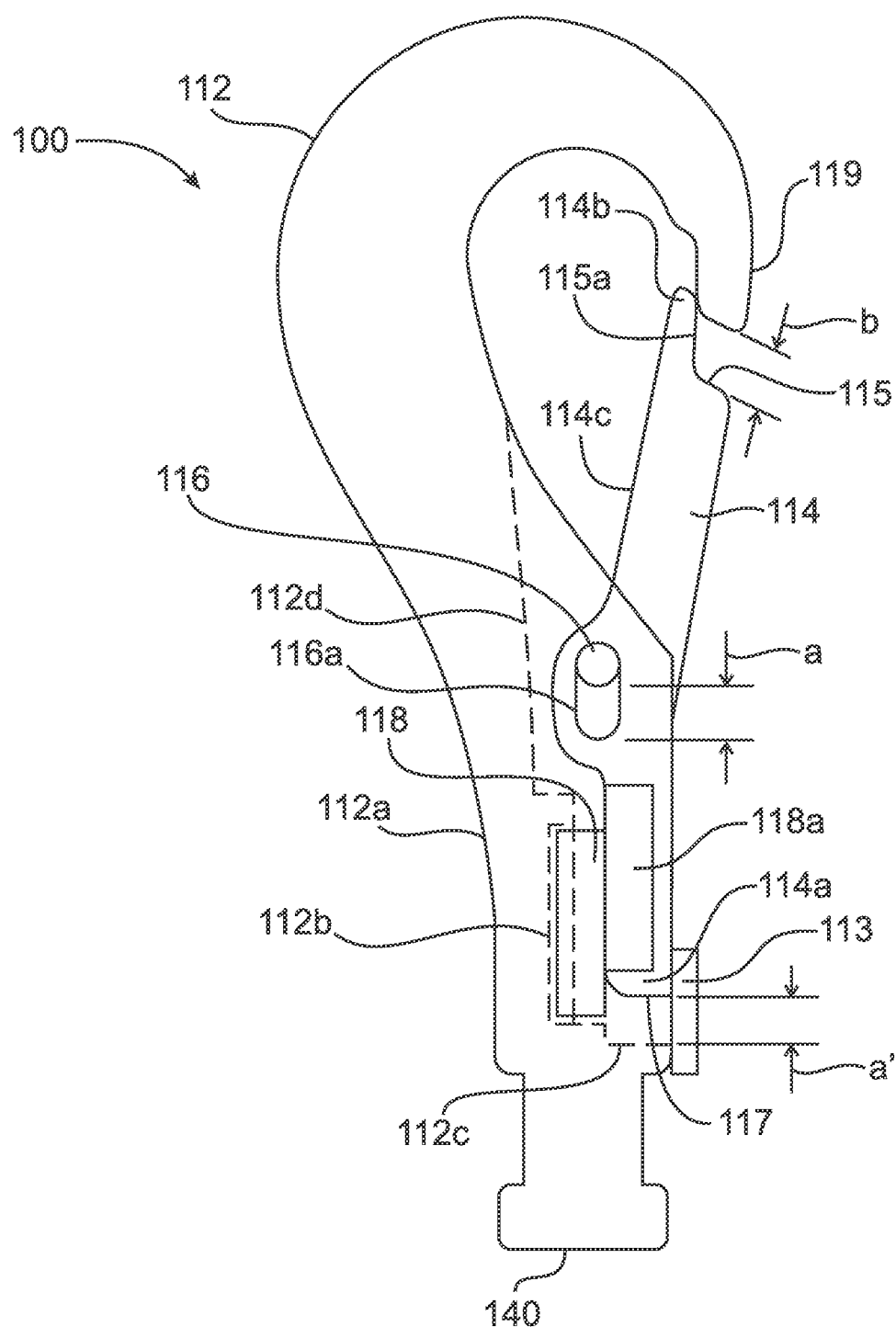
FIG. 11 is a side view of the second embodiment of the hook depicting the closure in the closed position i.e., spanning the space between second closure end and the hook body.

FIG. 11 is a side view of hook 100 depicting closure 114 in the closed position i.e., spanning the space between second closure end 119 and hook body 112. In the closed position, one curved end of oval slot 116a is shown nested against or contacting pivot 116 with a gap a between pivot 116 and the opposing end of oval slot 116a. Also shown is gap a' between groove wall 112c and closure edge 117. Gaps a and a' are approximately equal in size. Gap b is shown between offset 115 and second hook end 119 and is larger than gaps a and a'. Closure magnet 118a is shown embedded in closure 114 proximate to first closure end 114a opposite neck groove 112b. It can be seen that neck magnet 118 and closure magnet 118a are opposed to each other and also offset from each other. Preferably, magnets 118 and 118a are the same size and have equal and opposite magnetic force (opposite polarity). By offset is meant that magnets 118 and 118a do not align perfectly when closure 114 is in the closed position such that, for example, the ends of the two magnets do not align when closure 114 is closed. Neck magnet 118 and closure magnet 118a are of opposite polarity and are used to hold closure 114 in the closed position by magnetic force. As seen in FIG. 11, lip 113 is also used to retain closure 114 in the close position. Pin 116 is circular in shape.

In a preferred embodiment, closure magnet 118a in closure 114 is offset preferably ⅓ to ½ of its length from neck magnet 118 when it is rotated to the closed position. Because the opposing sides of the offset alignment and opposing magnets 118 and 118a are of opposite polarity, as magnet 118a approaches magnet 118, closure magnet 118a, and consequently closure 114, is pulled onto lip 113 by magnetic attraction from neck magnet 118 once closure end 114a and closure magnet 118a initially contact neck groove 112b. It is also evident that extension 115a must extend far enough to contact and preferably overlap, second end 119 in the closed position.

Figure 12:
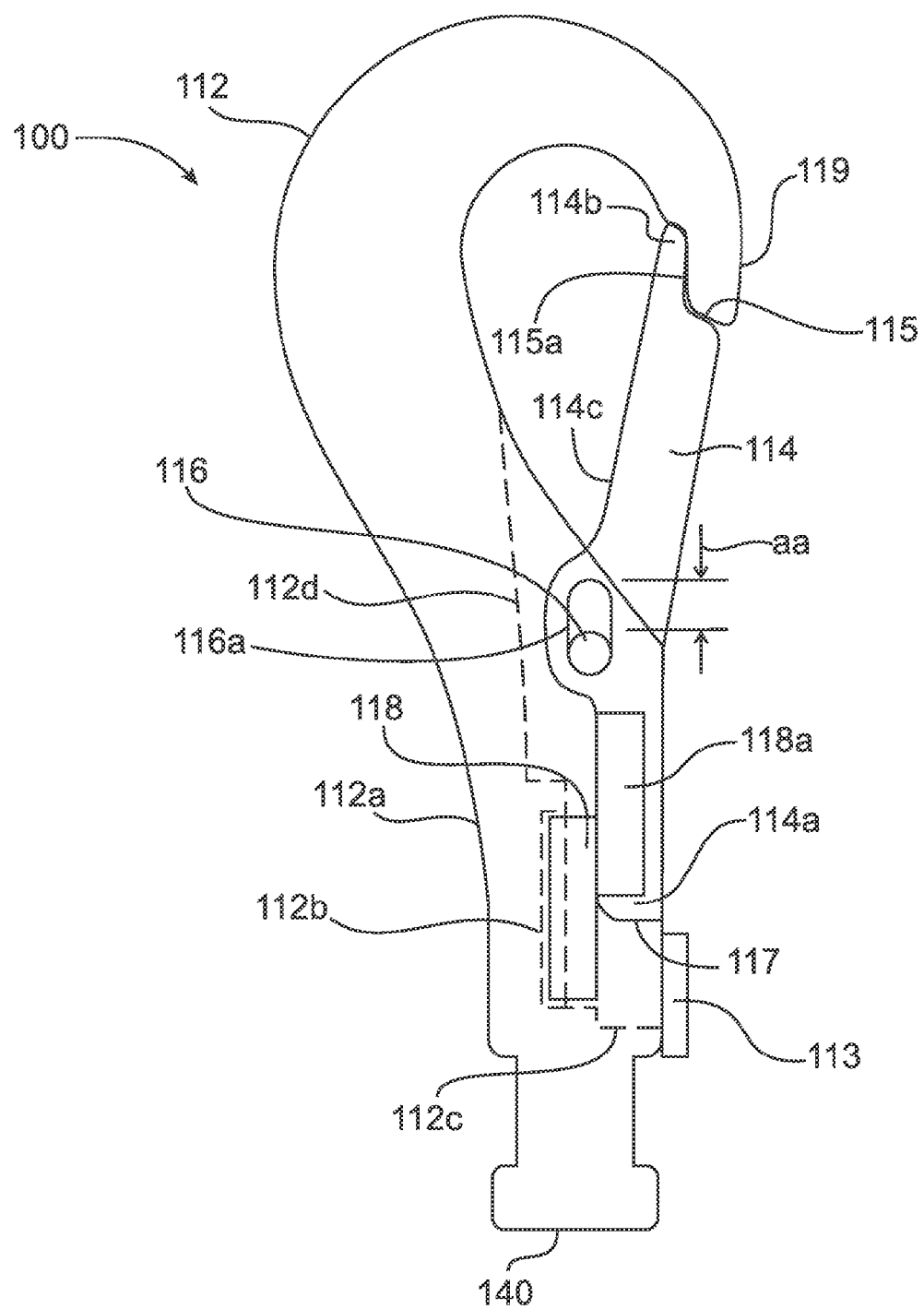
FIG. 12 is a side view of the second embodiment of the hook in which the closure is pushed forward off the lip.

FIG. 12 is a side view of hook 100 in which closure 114 is pushed forward off lip 113. Pivot 116 can be seen contacting the opposite curved end of oval shaped slot 116a.

Figure 13:
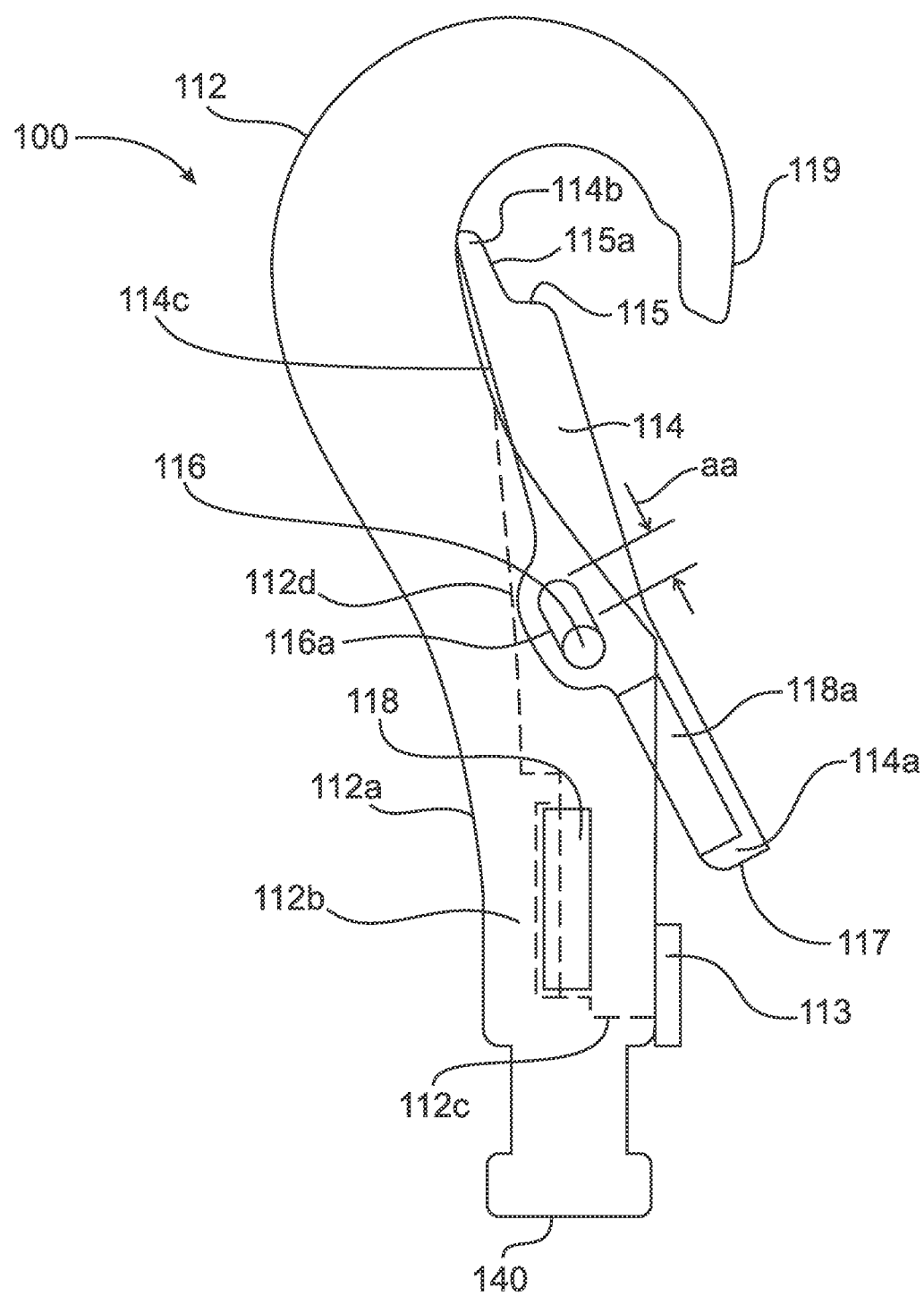
FIG. 13 is a side view of the hook showing the closure in the open position.

FIG. 13 is a side view of hook 100 showing closure 114 in the open position. Closure 114 is pivoted so that second closure end 114b is lifted off second hook end 119. To pivot closure 114 to the open position, closure 114 is slid or pushed forward generally toward second body end 119 by the user so that pivot 116 contacts the opposite end of the oval slot 116a creating a gap aa which is approximately equal in length to gap a seen in FIG. 11 and smaller that gap b. It will be noted that this allows closure 114 to slide forward and off lip 113 thereby unlocking closure 114 from the closed position. Referring to FIG. 11, it can be seen that the presence of gap b and offset 115 allows closure 114 to be pushed toward second hook end 119. Because gap b is larger than either of gaps a and a', first closure end 114a can be pushed off lip 113 when closure 114 is pushed forward toward second hook end 119 until slot 116a rests against pivot 116 because the greater size of gap b provides sufficient room to push closure 114 until first closure end 114a is pushed off lip 113 allowing it to be rotated away from neck groove 112b.

When closure 114 is rotated to the closed position, the opposite polarities of neck magnet 118 and closure magnet 118a attract first closure end 114a toward neck groove 112b while the offset orientation of the magnets creates a pulling force that pulls first closure end 114a onto lip 113 and afterwards continues to holds it between neck groove 112b and lip 113.

It can be seen that the structure of hook 100 helps to prevent the accidental opening of closure 114. A positive push of closure 114 toward second end 119 is required so that lip 113 no longer prevents its rotation into the open position. Significant also is the shape of slot 116a and the offset shape 115 of second closure end 114b. The offset shape allows second closure end 114b to contact second hook end 119 to keep hook 100 closed and still allow closure 114 to be pushed sufficiently forward to move first closure end 114a off lip 113 and to be rotated open. Therefore, hook 100 can hold items such as rings, ropes, etc. in the area defined by hook body 112 and closure 114 in the closed position. Because first closure end 114a rests between lip 113 and neck groove 112b, it is confined between hook neck 112a (and neck groove 112b) and lip 113 preventing it from accidentally opening.

Figure 14:
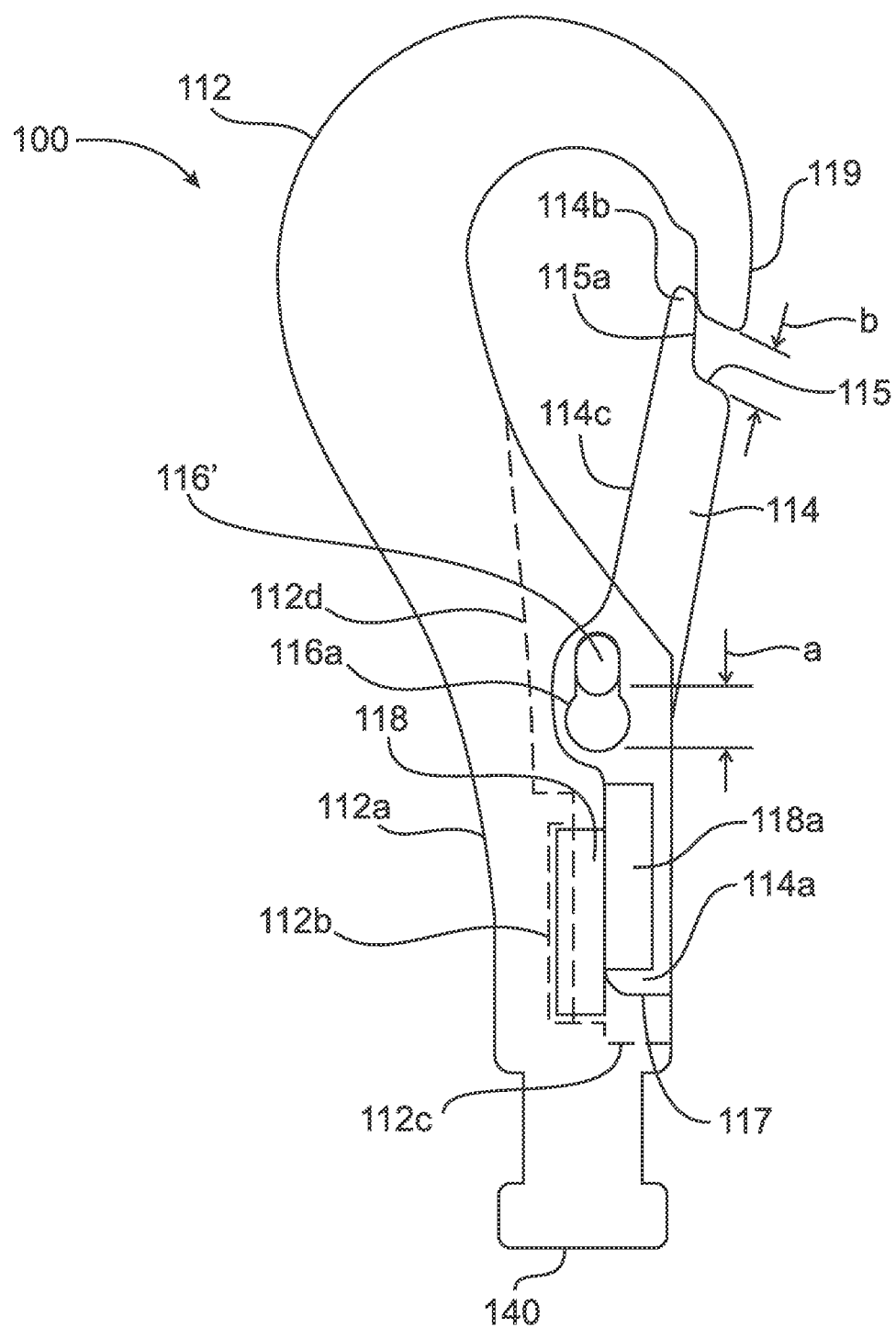
FIG. 14 is a side view of the second embodiment of the hook similar to FIG. 9 showing alternate embodiments of the closure slot and the pivot.

FIG. 14 is a side view of hook 100 depicting an alternate embodiment of closure 114 with slot 116b having a keyhole shape with rectangular and circular portions and pivot 116' having an oval shape. Lip 113 may be removed from this second embodiment. Preferably, the size of oval pin 116b and the straight portion of keyhole slot 116' are sized so that closure 114 is locked into the closed position so that it cannot rotate when pin 116b is in the rectangular portion of keyhole slot 116'. This locking position of pin 116' is combined with the pulling and closing magnetic force between neck groove 112b and first closure end 114a, caused by the opposite polarity and offset positioning of neck magnet 118 and closure magnet 118a, which keeps closure 114 closed and prevents the accidental or inadvertent opening of hook 100.

Figure 15:
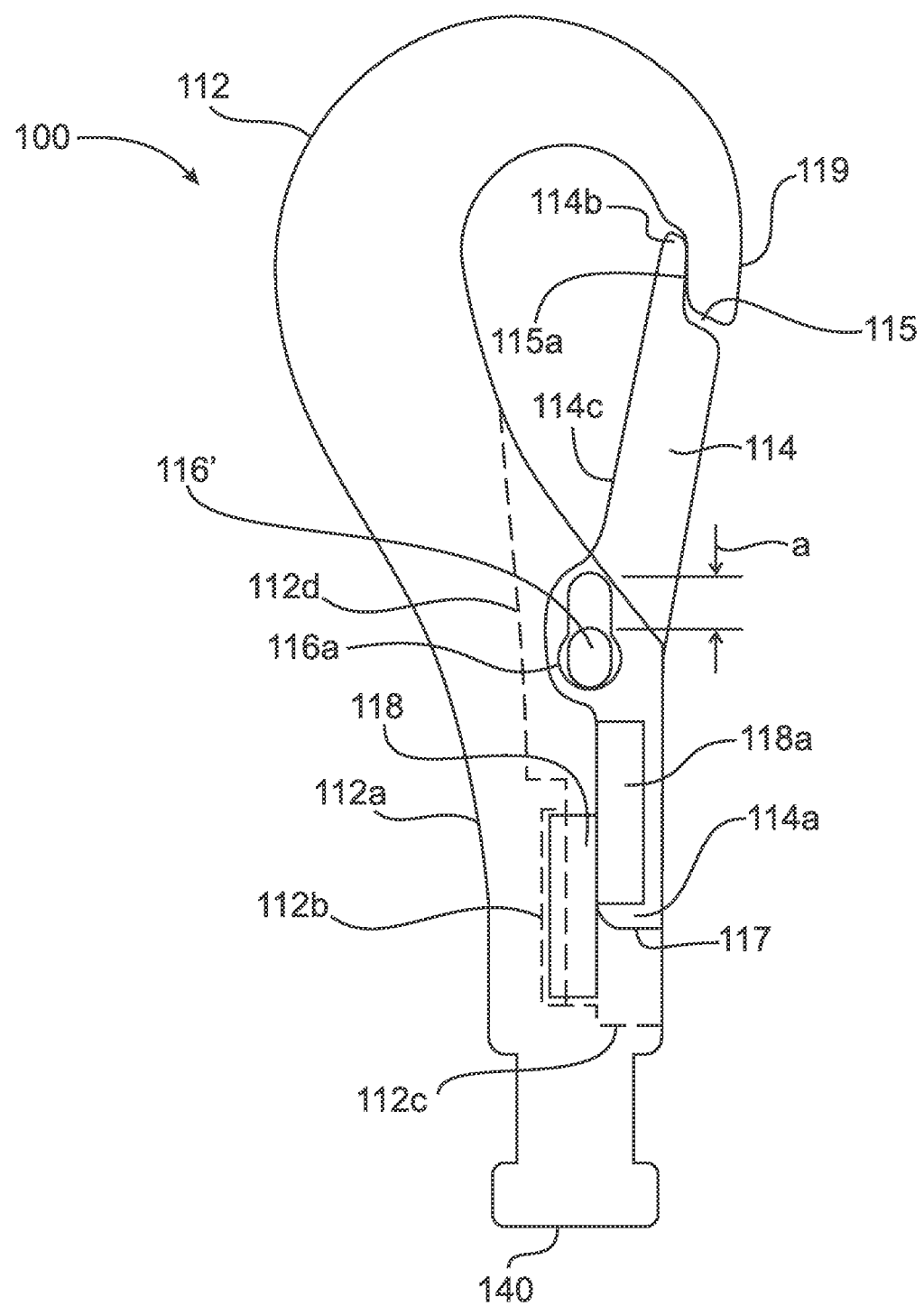
FIG. 15 is a side view of the hook seen in FIG. 14 showing the closure pushed toward the second hook end; and, FIG. 16 depicts the hook with the closure having the keyhole slot in the open position.

FIG. 15 is a side view of the alternate embodiment of hook 100 showing closure 114 pushed toward second hook end 119. Oval pivot pin 116' is located in the wider circular portion of keyhole slot 116b after closure 114 is pushed the distance of gap a seen in FIG. 14. With oval pin 116b in the circular portion, closure 114 is able to rotate into the open position as the circular portion of slot 116' rotates around pin 116b. It will be recognized that by pushing closure 114 toward second hook end 119, closure magnet 118a is moved away from neck magnet 118 Because gap b is larger than gap a, there is sufficient clearance to allow closure 114 to be pushed so pivot 116' is in the circular portion of keyhole slot 116b enabling closure 114 to rotate open.

Figure 16:
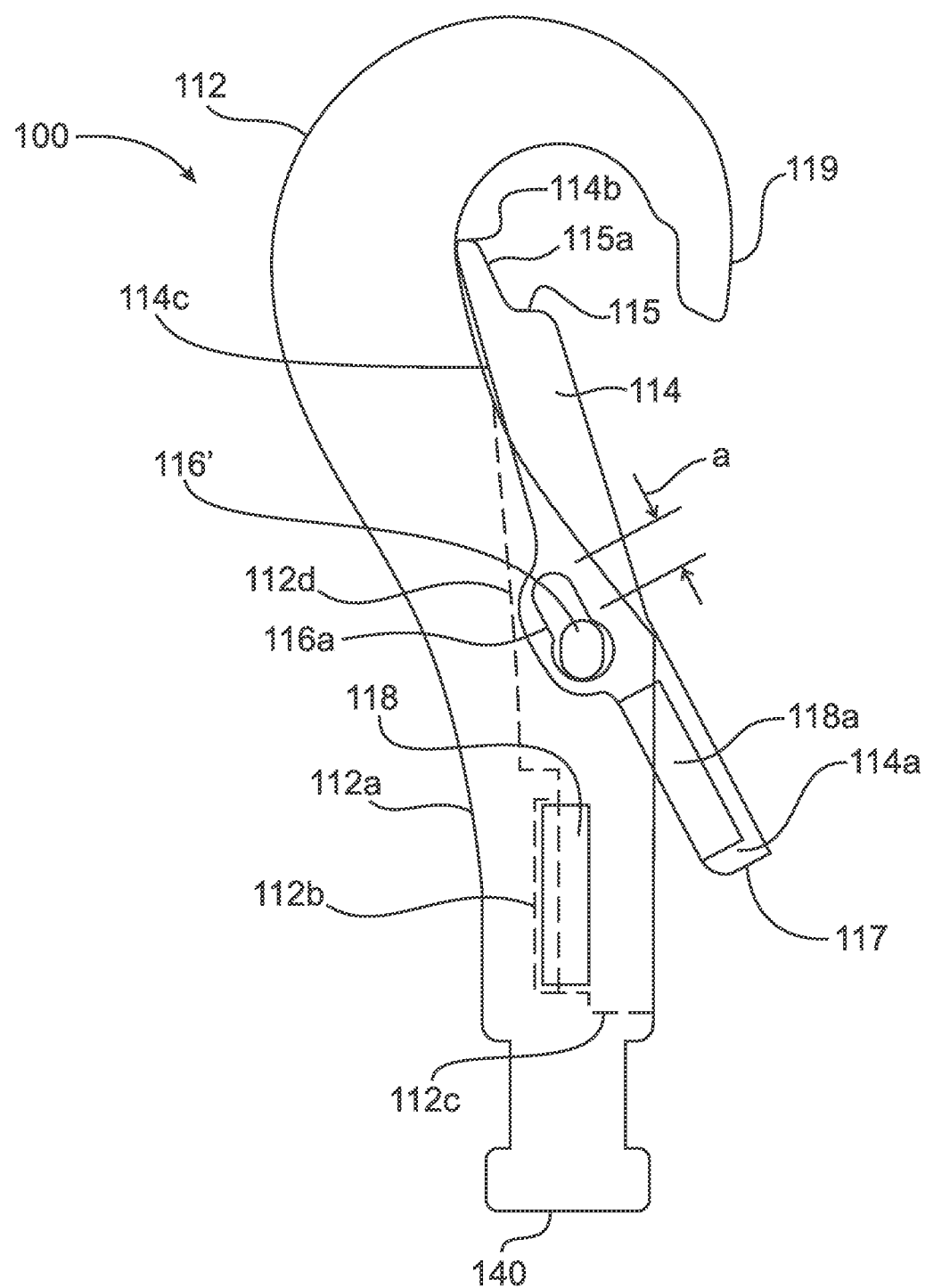

FIG. 16 depicts hook 110 provided with keyhole slot 116b in the open position. Pin 116' and the circular portion of slot 116b are sized to allow rotation or pivoting around pin 116' is sized to enable closure.

Finally, in both embodiments, a collar similar to collar 25 discussed above may enclose neck 112b and first end 114a of closure 114.

It can be seen that both forms of the alternate embodiment of hook 100 discussed above provide both a mechanical locking mechanism and a magnetic closing force on closure 114 in the closed position both of which are defeated by the ability to slide closure 114 forward because of the gaps configured in the pivotal connection of closure 114 to body 112 and between second closure end 112b and second end 119. The offset arrangement of neck magnet 118 and closure magnet 118a causes first closure end 114a to be automatically pulled into correct closing position without additional adjustment by the user.

Figure 17:
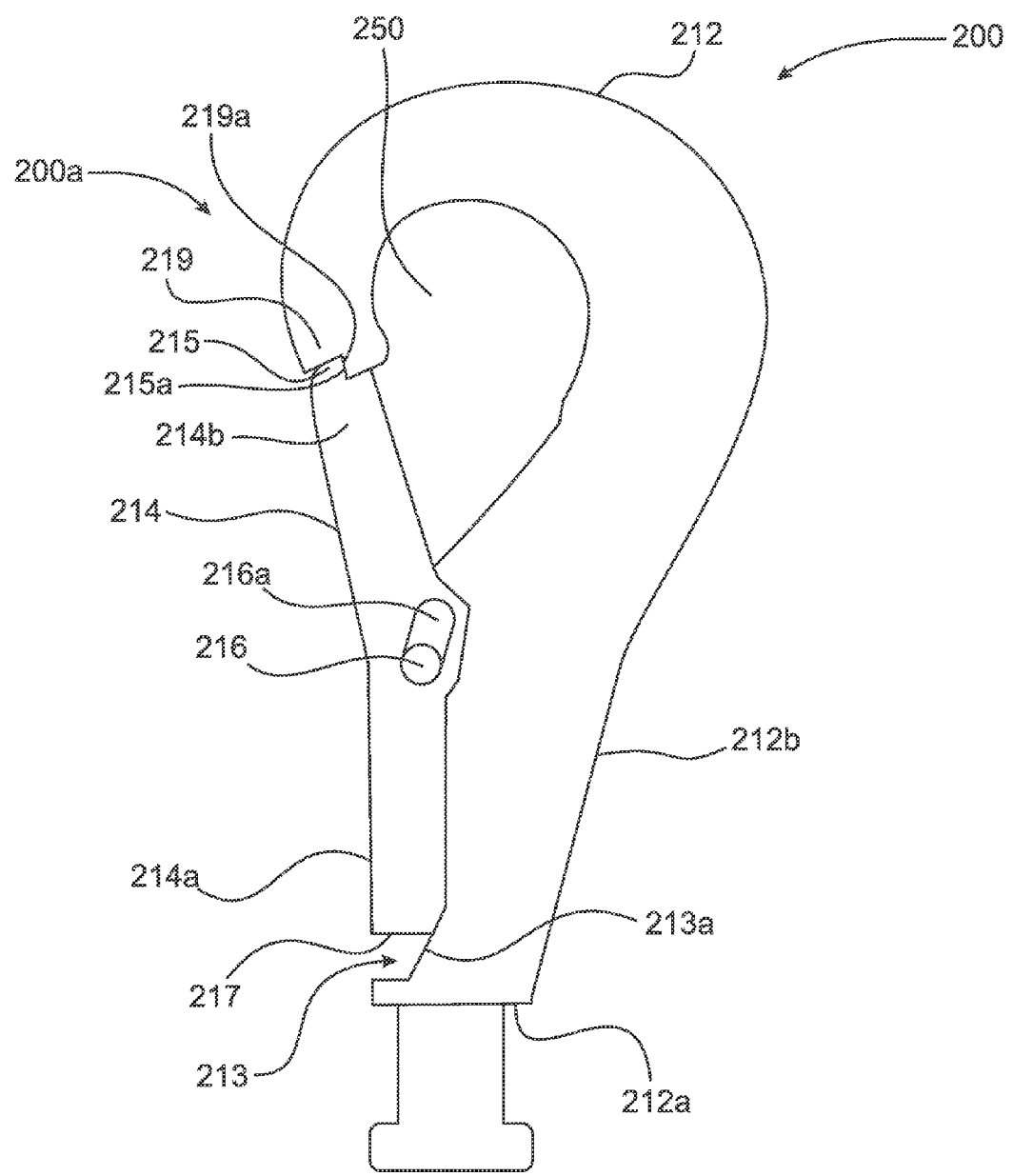
FIG. 17 is side view of an additional embodiment of the hook of the present invention.

FIGS. 17-20C depict an additional embodiment of the hook of the present invention. FIG. 17 is side view of hook 200 that includes body 212, neck 212b proximate first hook end 212a, and second hook end 219. Closure 214 is rotationally and slidably attached to pivot pin 216. Pivot pin 216 ("pin 216") extends through slot 216a. In the preferred embodiment shown, slot 214a is oval and pin 216 is circular or cylindrical. Closure 214 is similar to closure 114 discussed above and comprises first closure end 214a with closure edge 217 formed from first closure end 214a. Second closure end 214b includes offset 215 which is formed from a portion of second closure end 214b. Second closure end 214b also includes offset surface 215a. In one embodiment, closure 214 is fabricated from nonferromagnetic material(s) such as nickel alloy. Gap 213 is between closure edge 217 and first hook end 212c. Inclined floor 213a forms a ramp ("ramp 213a") that extends diagonally toward the closure side 200a of hook 200. Accessories, for example, rings, may be attached to first hook end 212a.

Second hook end 219 is configured to include an opposing offset surface 219a. In the closed position shown in FIG. 17, closure 214 spans the gap between hook body 212 and second hook end 219, It can be seen that in the closed position, offset surfaces 215a and 219a are opposed, i.e., contacting or almost contacting and facing in opposite directions. In the closed position, closure 214 and hook body 212 enclose space 250.

Figure 18:
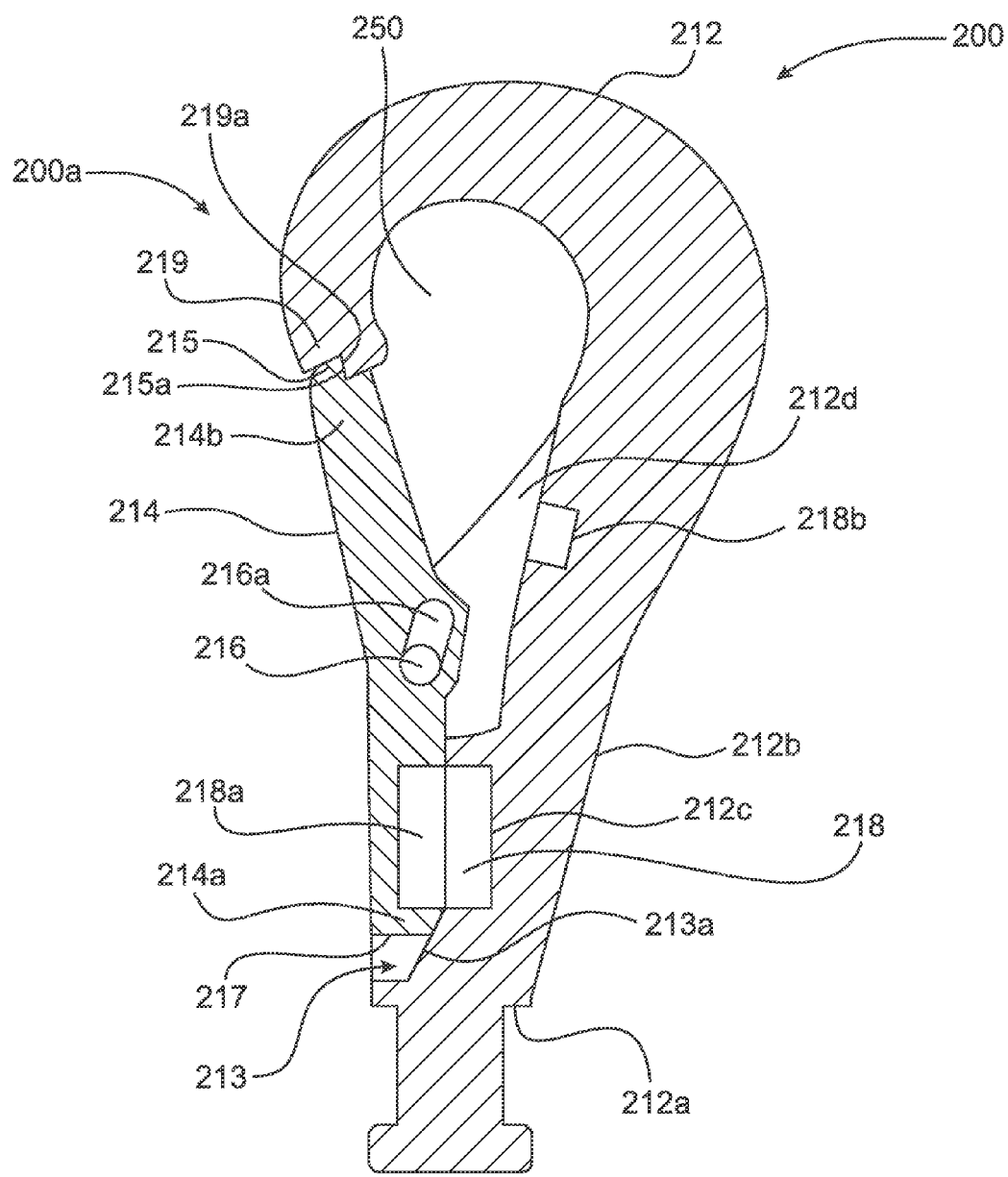
FIG. 18 is a side cross section view of the embodiment of the hook first seen in FIG. 17.

FIG. 18 is a side cross section view of hook 200. Magnet 218 is embedded or otherwise fixedly attached to neck groove 212c in such a way that it attracts opposing magnets or magnetized material. Magnet 218a is generally embedded near first closure end 214a and positioned to be directly aligned with magnet 218. Magnets 218 and 218a have opposite polarity making them mutually attractive. This mutual magnetic attraction holds closure 214 in the closed position with closure 214 reaching and contacting second hook end 219 as shown. In addition, opposing surfaces 215a and 219a contact each other in the closed position shown in FIG. 18. Neck groove 212c may extend past pin 216 into an inner surface of inner hook body 212 to form receiving groove 212d. As shown, receiving magnet 218b optionally may be placed in receiving groove 212d if closure 214 is formed at least partially from ferromagnetic material to make it attracted to magnets.

Figure 19A:
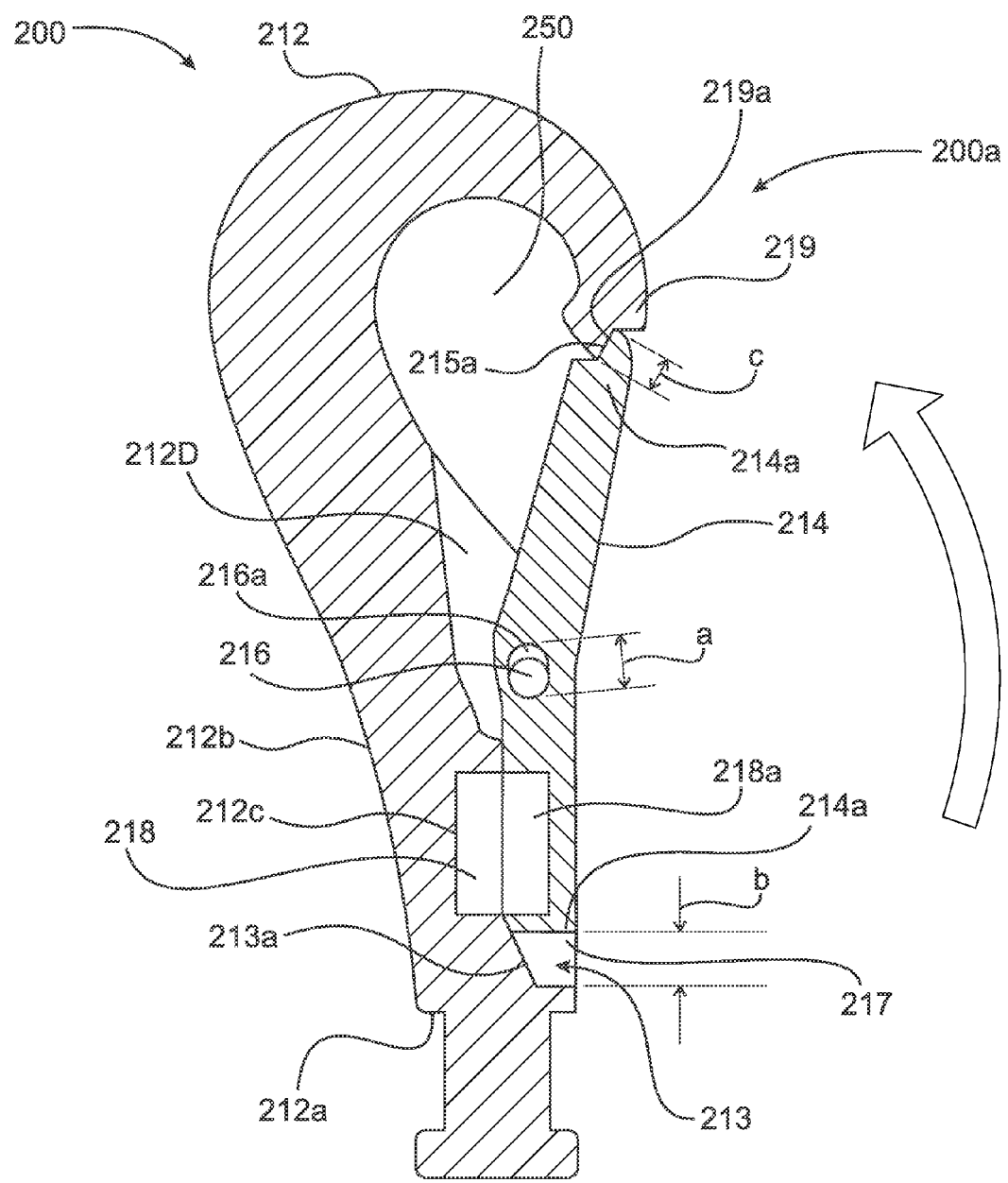
FIG. 19A is a side cross section view showing the hook in the closed position.
Figure 19B:
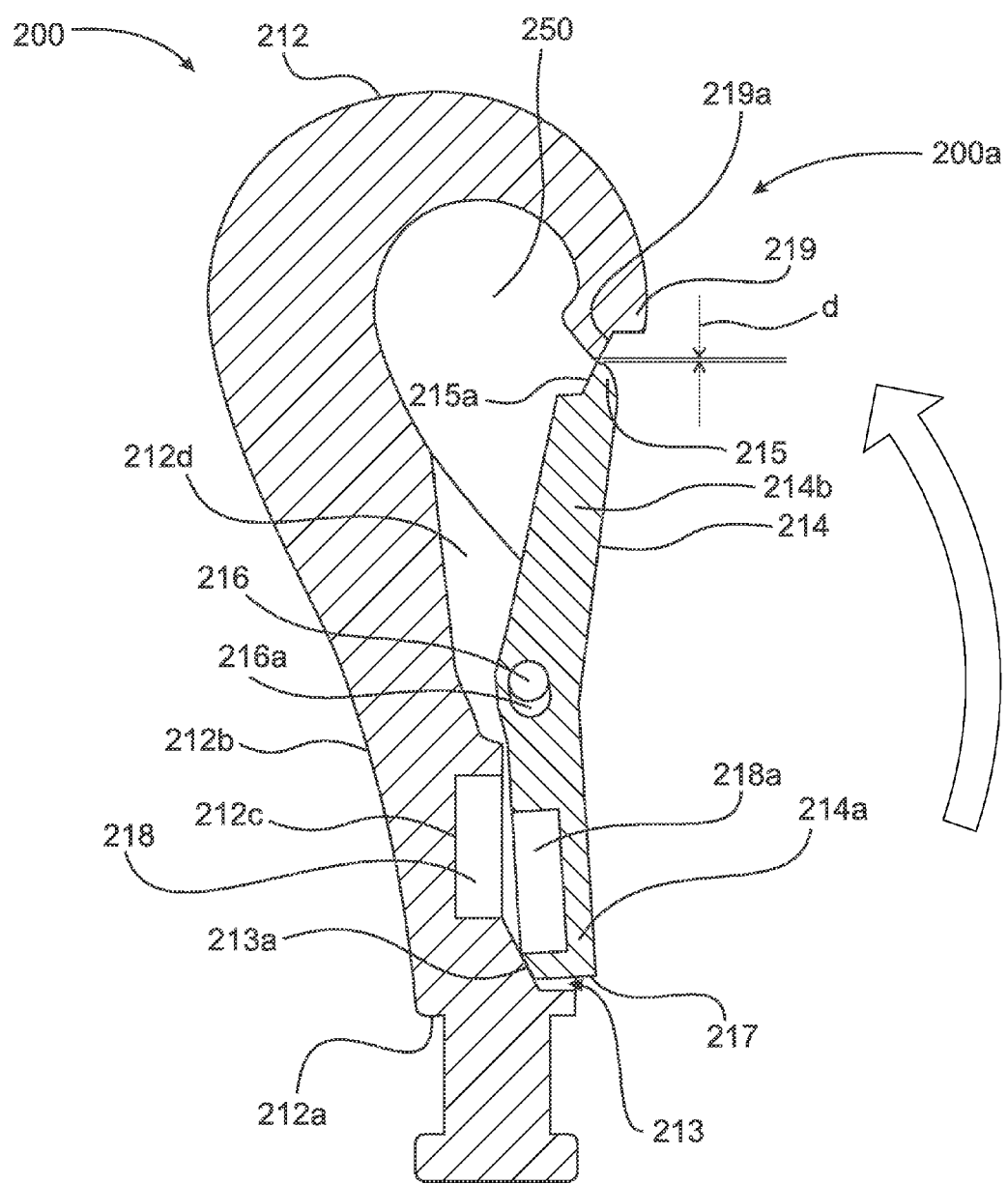
FIG. 19B shows the hook as the closure moves from the closed to the completely open position.
Figure 19C:
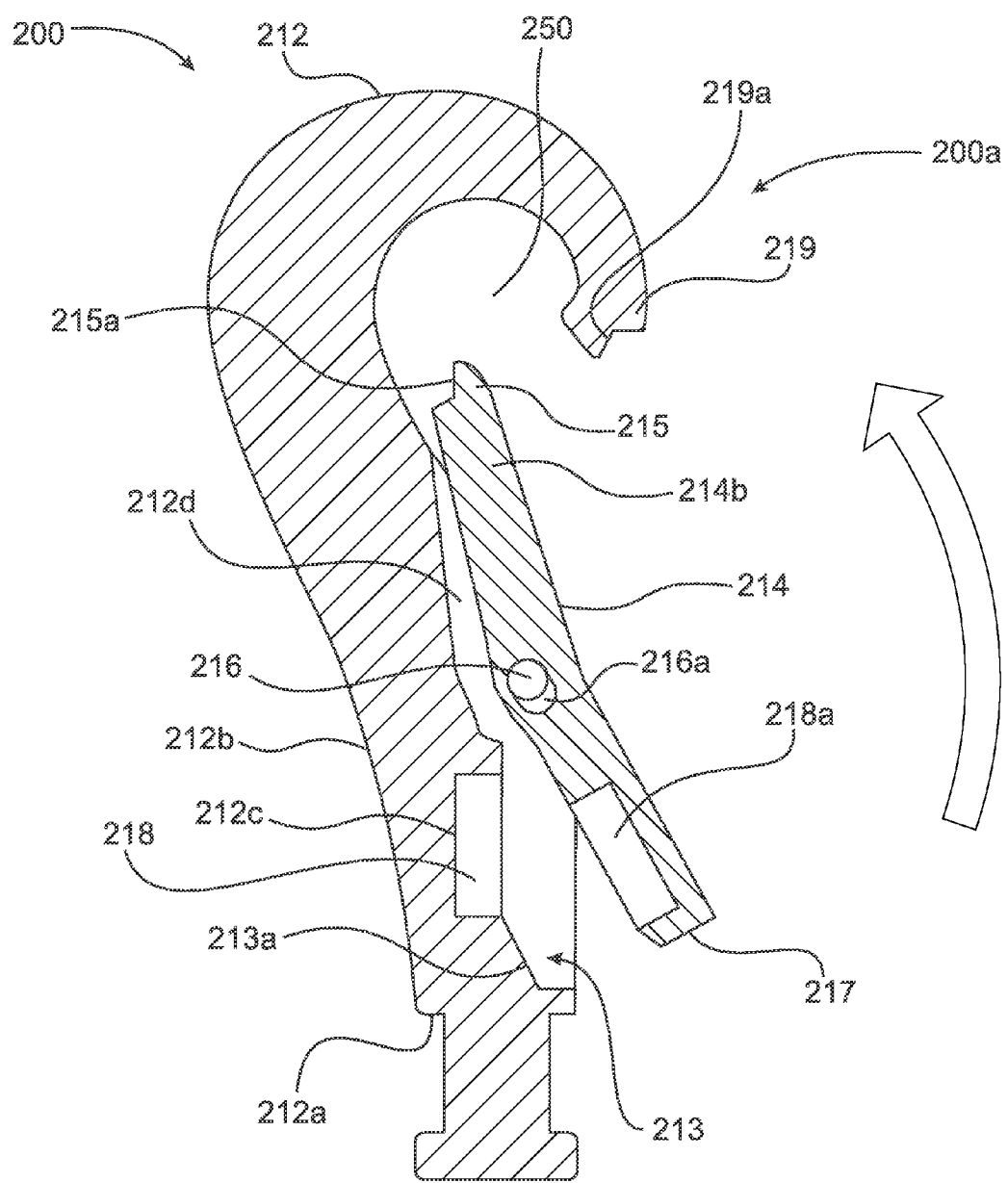
FIG. 19C depicts the hook as it approaches the open position.

FIGS. 19A-C depict the movement of closure 214 from the closed to the open position. FIG. 19A is a side cross section view showing hook 200 in the closed position. Offset surfaces 219a and 115a are opposed to each other and preferably touching. It can be seen from the arrows that closure 214 and offset surface 115a rotates into the closed position from the closure side 200a. The length of the gap between the edge of pin 216 and the second end of slot 216a is designated as length a while the length of gap 213 is shown as length b. The length of offset surface 115a is shown as length c. It can be seen that length b is equal to or longer than length a. Length c is less than length a and thus also less than length b.

FIG. 19B shows hook 200 as closure 214 moves from the closed to the completely open position. First closure end 214a is moved through gap 213 toward first hook end 212a. This action can be achieved by the user's thumb or finger pulling closure through gap 213. It can be seen that as closure 214 is moved toward first hook end 212a, offset end 215 and offset surface 215a is moved from offset surface 219a toward pin 216. Because slot 216a is in the preferred oval shape and length a is greater than length c, closure 214 has sufficient clearance to move offset surface 215a completely away from offset surface 219a as depicted by the sight gap between offset 215 and second hook end 219.

As first closure end 214a is pulled through gap 213, it travels up ramp 213a. The angle of ramp 213a enables closure magnet 218a to be separated from neck magnet 218 thereby reducing the magnetic force holding hook 200 in the closed position.

FIG. 19C depicts hook 200 as it approaches the open position. Second closure end 214b is approaching receiving groove 212d to be received into receiving groove 212d. The presence of receiving groove 212d is not necessary but is preferred as nesting closure 214 into receiving groove 212d provides a larger opening into defined area 250 between second hook end 219 and offset 215. Magnets 218 and 218a are separated amply to enable the user to easily hold closure 214 open, preferably by pressing second closure end 214b into receiving groove 212d.

Figure 20A:
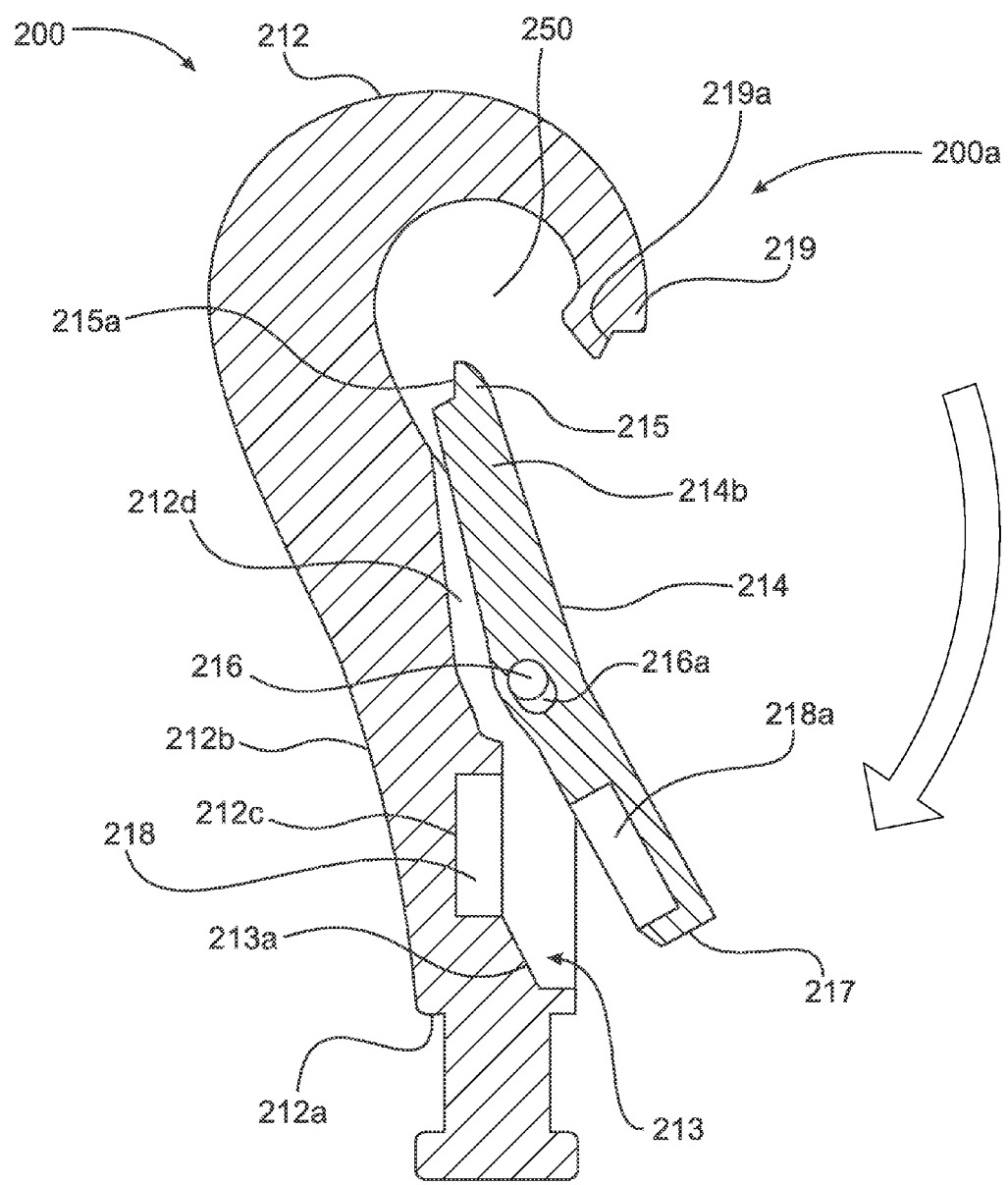
FIG. 20A shows the hook returning to the closed position as shown by the arrows.

FIG. 20A shows hook 200 returning to the closed position as shown by the arrows. User releases the pressure holding second closure end 214b into receiving groove 212d. Closure magnet 218a has remained attracted to neck magnet 218 which starts first closure end 214a rotating on pin 216 toward first hook end 212a and gap 213.

Figure 20B:
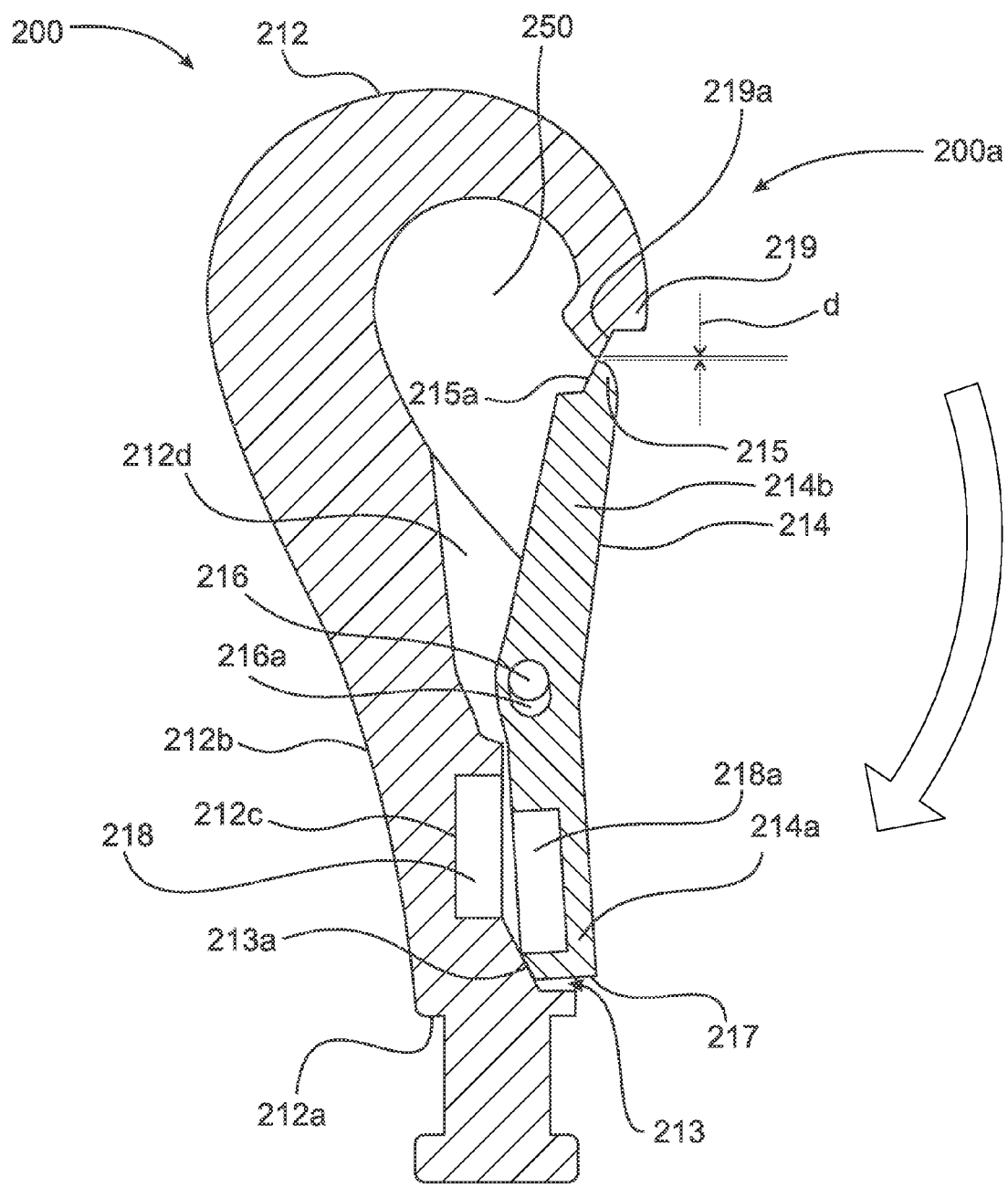
FIG. 20B shows the hook with the offset clearing the second hook end at the same time the first closure end and the closure edge return to the gap.

FIG. 20B shows hook 200 with offset 215 clearing second hook end 219 at the same time first closure end 214a and closure edge 217 return to gap 213. After offset 215 rotates past second hook end 219, edge 217 starts to slide down ramp 213a, pulled by the magnetic attraction between closure magnet 218a and neck magnet 218.

Figure 20C:
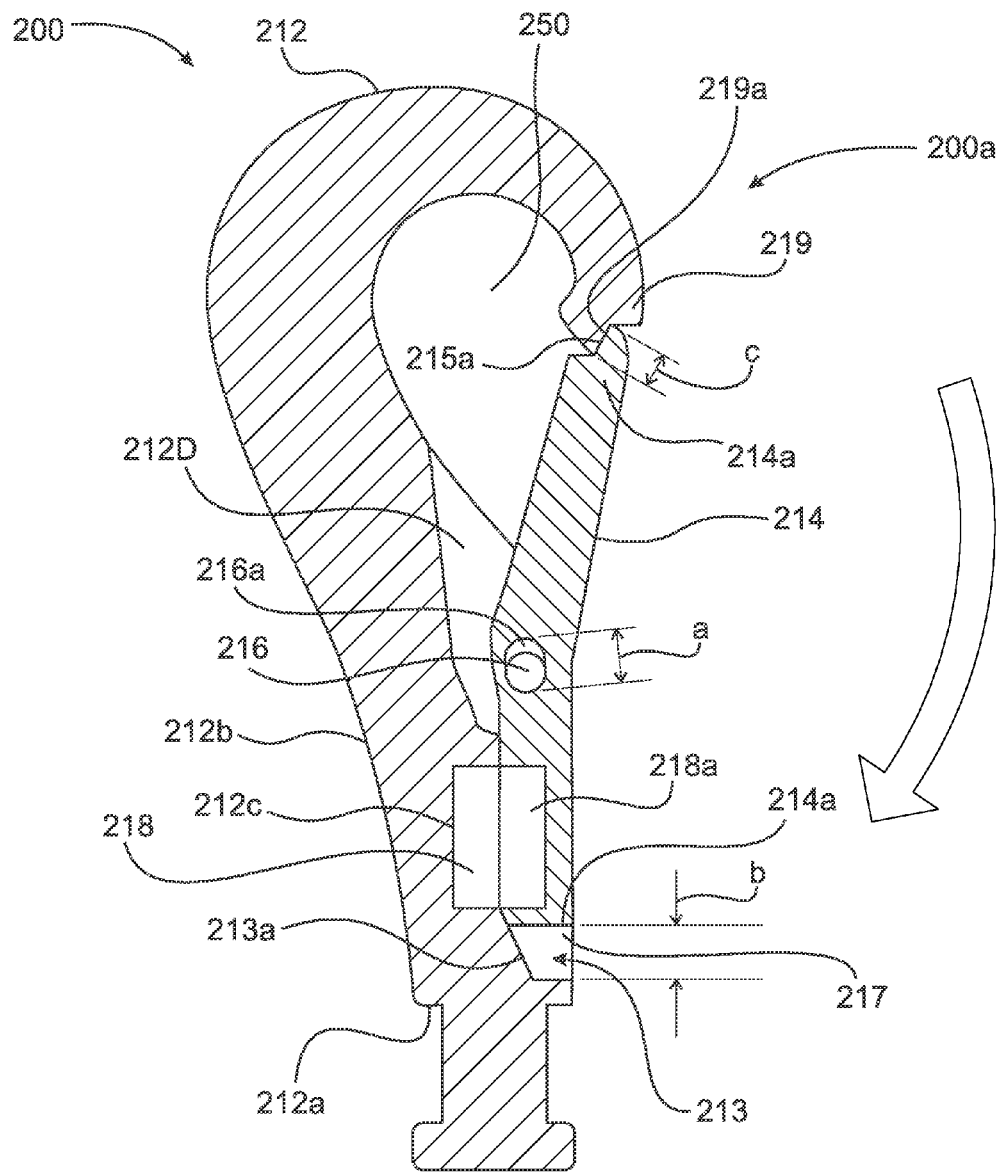
FIG. 20C depicts the hook returned to the closed position seen in FIG. 19A; and, FIG. 21 depicts the relative angles of the ramp in the hook body and the slot in the closure.

The arrangement of ramp 213a and the magnets enables closure 214 to return to the closed position with magnets 218 and 218a aligned and holding first closure end 214a to neck groove 212c and offset 215a contacting opposing offset surface 219a as seen in FIG. 20C.

In a preferred embodiment of hook 200, closure 214 has the angled shape shown in FIGS. 17-21 in which a first closure portion between closure edge 217 and slot 216a extends approximately perpendicularly from plane P extending through first hook end 212a. A second closure portion extends from slot 216a to second hook end 219 at a nonperpendicular angle relative to plane P. This provides for maximum space 250. In a more preferred embodiment, closure 214 rapidly and automatically returns to the closed position with magnets 218 and 218a aligned in neck groove 212c and offsets 219a and 215a opposed to and contacting each other. As seen in FIG. 20B, this rapid closing movement requires clearance of offset end 215 before first closure end 214a is nested in neck groove 212c. The incline of ramp 213a advantageously delays the closing rotation of closure 214 while simultaneously continuing the outward rotation of closure 214 and pushing it offset 215a toward second hook end 219 and offset 219a. Toward this end, the oval shape of slot 216a provides the space to enable closure 214 to move toward second hook end 219 as well as the space to move closure 214 away from second hook end 219 when it is opened.

Figure 21:
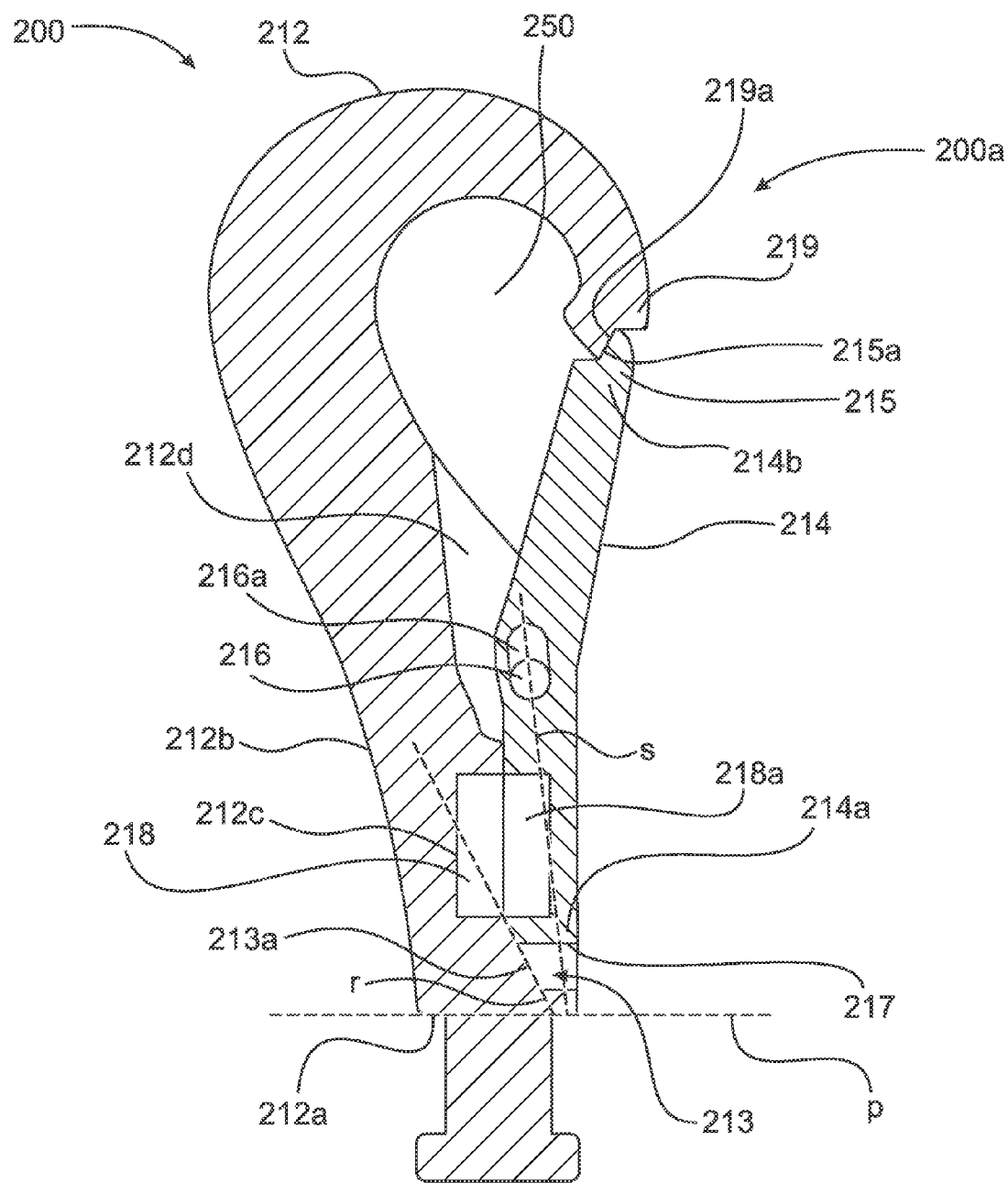

FIG. 21 depicts a preferred embodiment in which slot angle s is less than ramp angle r relative to plane P. In one preferred embodiment, angle s is approximately one half the angle of ramp angle r. To utilize an angled closure 214 as shown in the drawings and described above, angle r must be greater than angle s to ensure closure 214 will rotate properly in toward space 250. The closer to equivalence angles r and s become, slot 216 will slide closer to a track that is parallel to neck 212b making closure 214 difficult to rotate properly.

Figure 22:
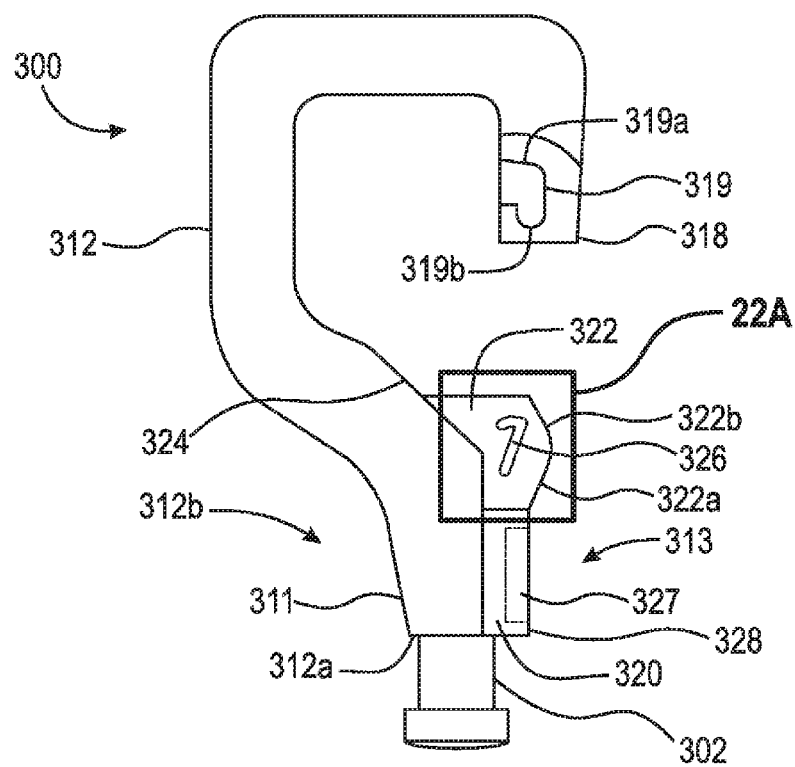
FIG. 22 is a side view of a second additional embodiment of the hook of the present invention.
Figure 22A:
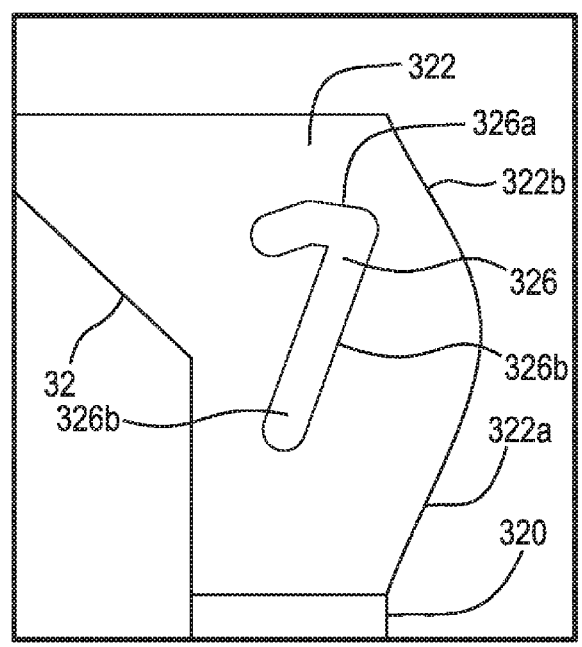
FIG. 22A is an enlarged side view of the portion of FIG. 22 enclosed in area 22A.

FIGS. 22-28A depict a second additional embodiment of the hook of the present invention. FIG. 22 is a side view of hook 300 including body 312, neck 312b, which is proximate first hook end 312a, and second hook end 318. Preferably, hook 300 is fabricated from nonferromagnetic material. Attachment means 302 is attached to hook 300 at the end of first hook end. Examples of attachment means 302 are, but not limited to, D-rings, posts with or without a tie-off hole, swivel rings, etc. Second hook end 318 includes j-hook 319. Neck 312b has an outer surface 311 ("surface 311") and an opposing inner surface 313 ("surface 313"). Surface 313 includes center ridge 320 that extends from first hook end 312a to form flange 322. Flange 322 extends to angled portion 324 of hook body 312. Flange 322 includes oblique portions 322a and 322b, respectively, and also defines slot 326. Preferably, slot 326 includes two legs 326a and leg 326b with the former having a bend in its length and pointed at angled portion 324. Center ridge 320 has a flat top surface 328 (not clearly seen in FIG. 22) in which hook magnet 327 is embedded in such a way that one face is exposed on top surface 328 or is embedded so that its magnetic force is not diminished by top surface 328. FIG. 22A is an enlarged side view of the portion of FIG. 22 enclosed in area 22A showing more clearly legs 326a and 326b of slot 326 as well as the orientation of slot 326 in flange 322. Flange 322 includes first oblique surface 322a and second oblique surface 322b.

Figure 23A:
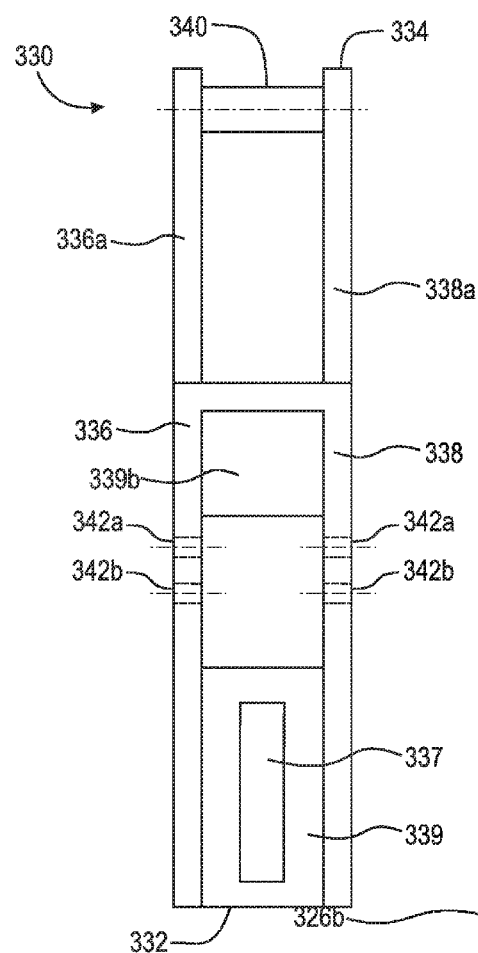
FIG. 23A is a front view of the closure for the hook of the second additional embodiment of the present invention.
Figure 23B:
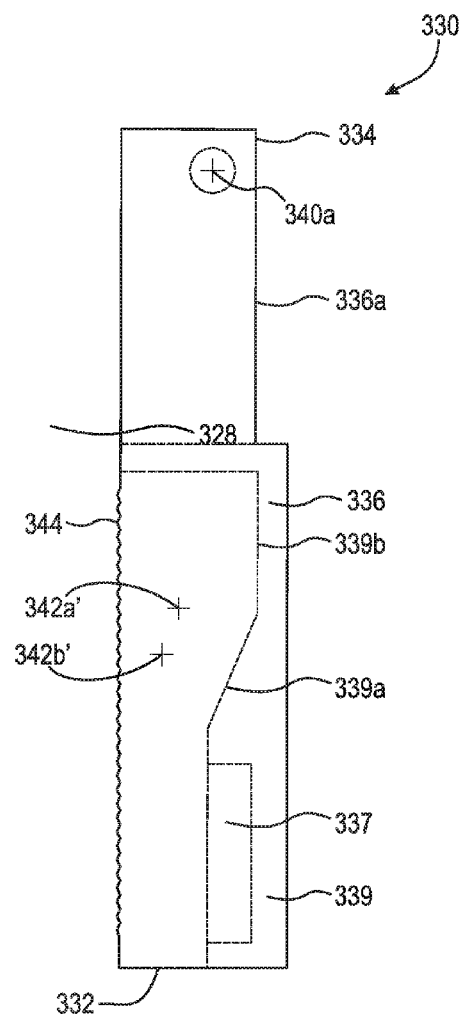
FIG. 23B is a side view of the closure seen in FIG. 23A.

FIG. 23A is a front view of closure 330 having first closure end 332 and second closure end 334 while FIG. 23B is a side view of closure 330. As seen in FIG. 23A, first lateral side 336 and second lateral side 338 (collectively "lateral sides"), which each include opposing legs 336a and 338a, respectively, form opposing sides of closure 330 extending from first closure end 332 to second closure end 334. Bridge 340 extends between lateral sides 336 and 338 at or proximate second closure end 334. Closure magnet 337 is embedded in the floor of channel 339 formed by lateral sides 336 and 338 in such a way as to have a surface exposed to utilize its magnetic attractive force. Sloping channel 339a and plateau 339b are included in the floor of channel 339. Opposing pairs of pin holes 342a and 342b are defined by lateral sides 336 and 338. As described below, paired pin holes 342a and/or 342b each receive a pin that extends between lateral sides 336 and 338. Thus, closure 330 may have one or, preferably, two pins. Closure 330 is able rotate around the pin(s).

The side view seen in FIG. 23B shows closure 330 with first lateral side 336 facing up out of the drawing sheet. Seen in shadow is closure magnet 337 embedded in channel 339 as well as sloping channel 339a and plateau 339b which are both part of channel 339 extending between sides 336 and 338. Also seen are pin holes 342a and 342b defined by first lateral side 336 and bridge attachment position 340a. Bridge 340 is fixedly attached to legs 336a and 336b, respectively, of lateral sides 336 and 338 by glue, plastic or metal welding, friction fitting, or other suitable methods well known to those having skill in the art. Optional traction surface(s) 344 may be added to the surface opposing channel 339 to enable pushing of closure 330 when a user opens hook 300 as explained below. Traction surface 344 may be knurls as shown, a roughened surface(s) similar to sandpaper, ridges, or other forms familiar to those having skill in the art.

Figure 24:
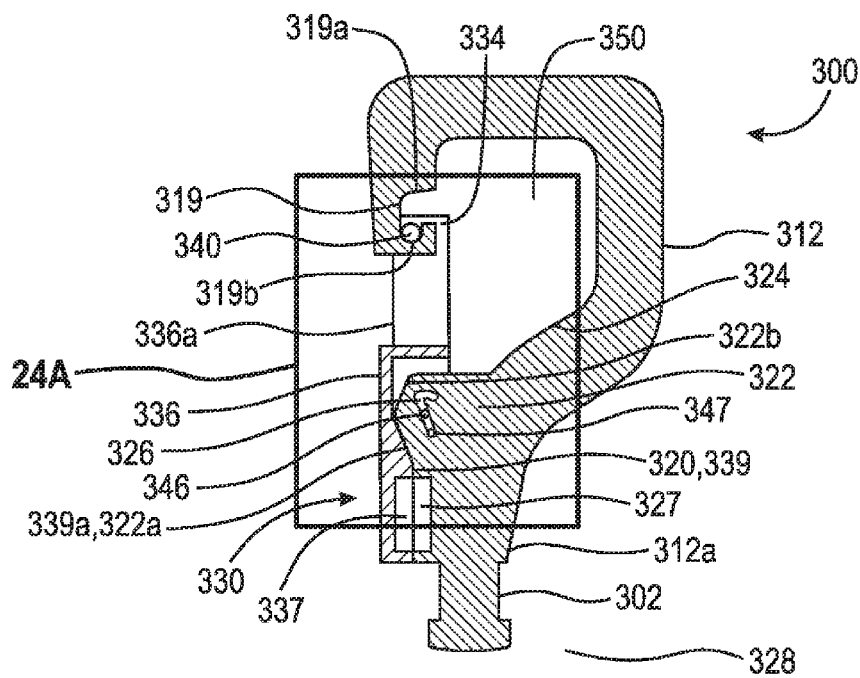
FIGS. 24-28A are lengthwise cross section views depicting the movement of the closure relative to the hook body when the hook is opened.

FIGS. 24-28A are lengthwise cross section views depicting the movement of closure 330 relative to hook body 312, particularly center ridge 320, flange 322 and slot 326, when hook 300 is opened. FIG. 24 depicts hook 300 in the closed position. J-hook 319 includes angled sliding surface 319a and notch 319b which holds bridge 340. A j-hook is defined as a notch or indentation having the form of the letter "J" with the curved portion of the notch receiving the device or component to be held. First or upper pin 346 and second or lower pin 347 (collectively pins 346 and 347) are slidingly engaged in leg 326b of slot 326. By slidingly engaged is meant that pins 346 and 347 slide freely within both legs of slot 326 when closure 330 is moved by a user. Closure 330 also rotates around pins 346 and/or 347. Hook magnet 327 and closure magnet 337 face each other and have opposite polarity to enable the releasable magnetic attraction of first hook end 312a with first closure end 332 when hook 300 is closed. Although it is preferable to utilize opposing magnets in closure 330 and inner surface 313, persons of skill in the art will recognize that either hook magnet 327 or closure magnet 337 may be replaced by a suitable segment of ferromagnetic material to releasably hold the opposing magnet. Hook 300 encloses defined area 350 when closed.

Figure 24A:
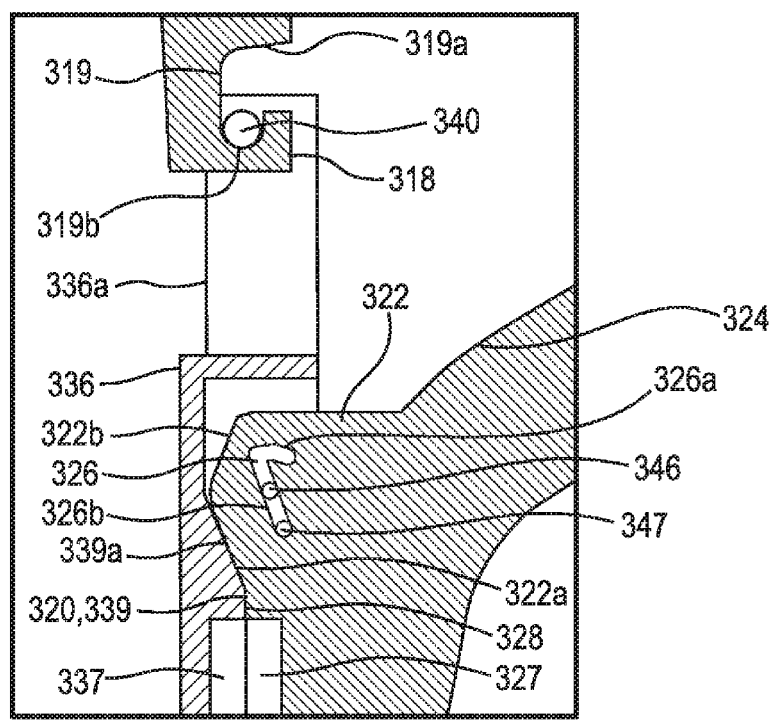
FIG. 24A is an enlarged view of area 24A of FIG. 24.

FIG. 24A is an enlarged view of area 24A of FIG. 24. In the closed position, it can be seen that sloping channel 339a of closure 330 rests against oblique portion 322a of flange 322. In the closed position, second notch 321 is formed by second closure end 334 and j-hook 319 which advantageously provides an indentation to hold rope, cord, twine, wire, or other similar objects in such a way that they will rest in second notch 321 and press on second closure end 334 to keep it in the closed position.

Figure 25:
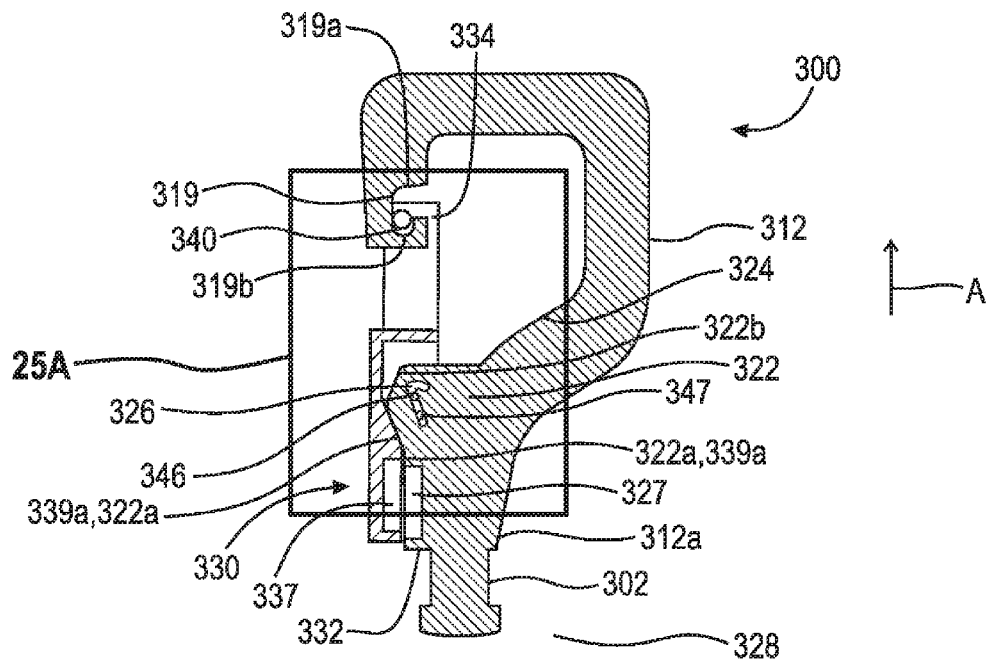
Figure 25A:
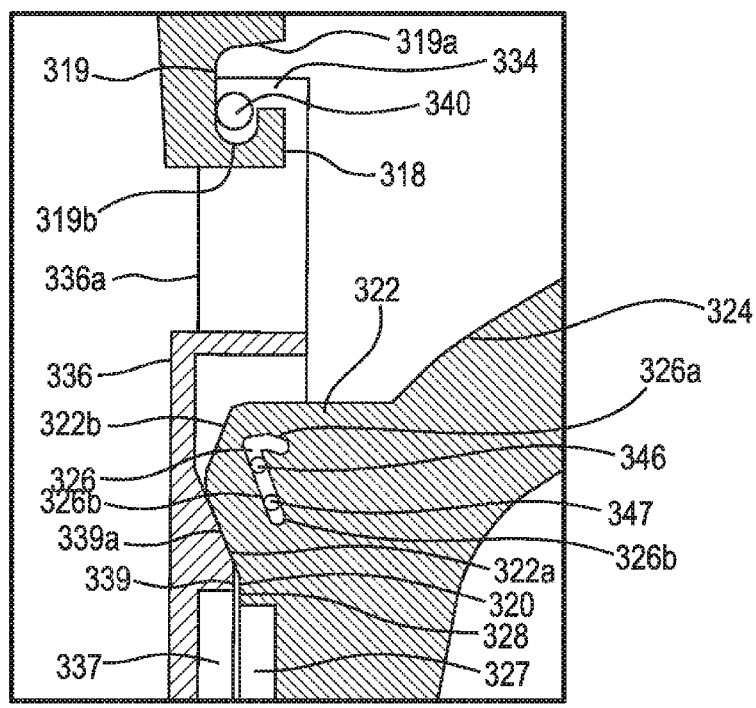

FIGS. 25 and 25A show the first movement of closure 330 to open hook 300. The opening of hook 300 is started by pushing closure 330 toward second hook end 319 as indicated by arrow A. Simultaneously, pins 346 and 347 slide upward along slot leg 326b of slot 326 and sloping channel 339a slides upward along oblique portion 322a at the same or approximately same angle as slot leg 326b. Bridge 340 is lifted out of notch 319b. This upward angled movement starts to separate magnets 337 and 327 or, alternatively, starts to separate a magnet from an opposing ferromagnetic segment. Second notch 321 starts to shorten in length as second end 334 moves toward sliding surface 3419a.

Figure 26:
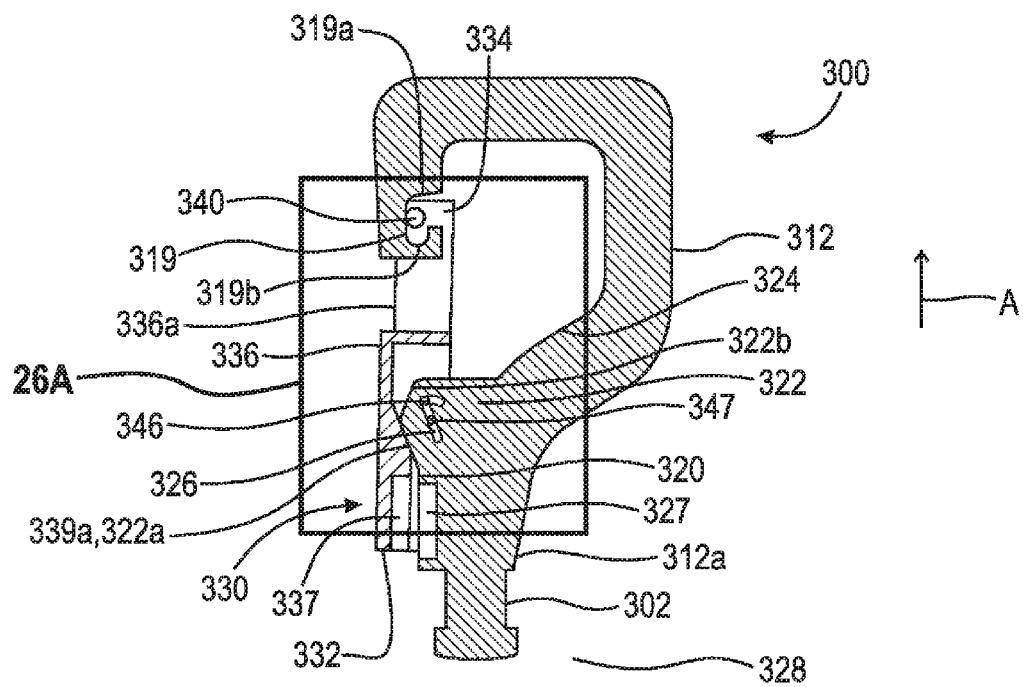
Figure 26A:
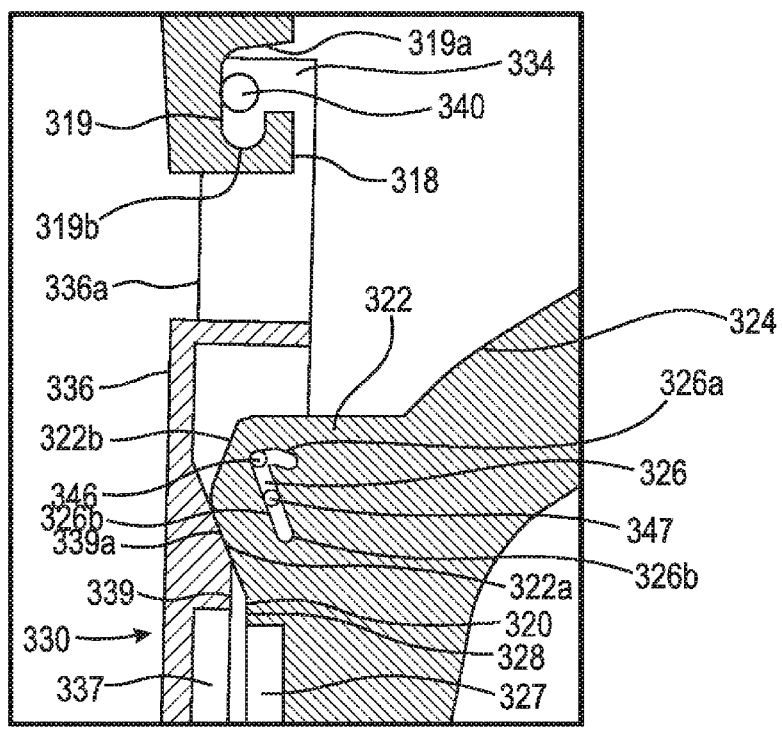

FIGS. 26 and 26A portray the position of closure 330 relative to hook 300 when first pin 346 reaches the end of slot leg 326b, i.e., at the junction of slot legs 326a and 326b. Closure 330 is sized relative to hook body 312 so that when first pin 346 slides to the end of slot leg 326b, second closure end 334 contacts sliding surface 319a of j-hook 319. At the same time, magnets 337 and 327 are separated further as sloping channel 332a is moved further along oblique portion 322a making it easier to open hook 300 as the magnetic attraction between magnets 337 and 327 weakens.

Figure 27:
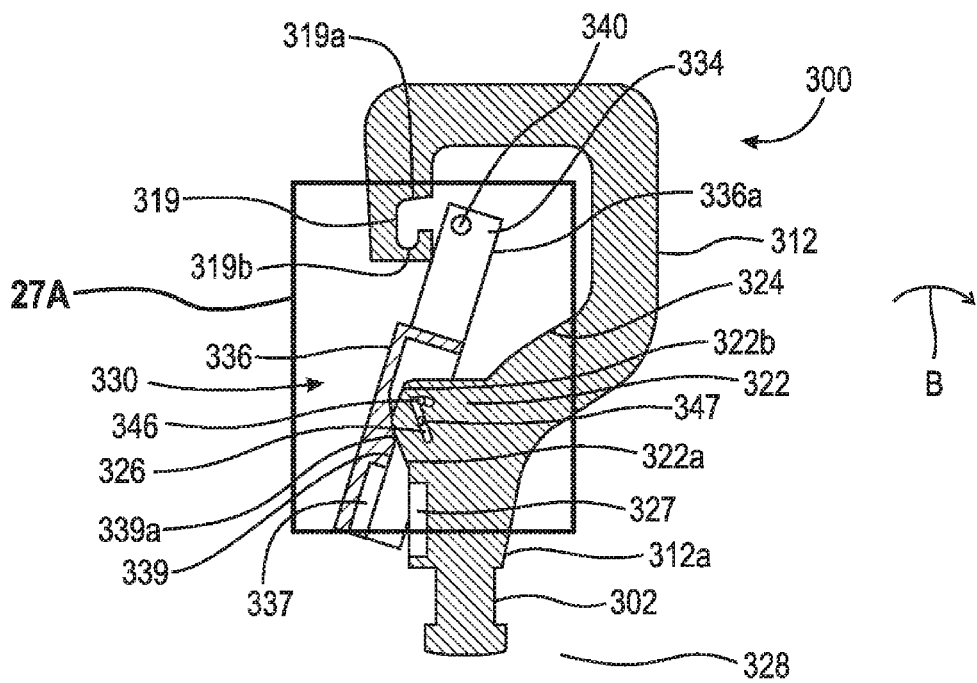
Figure 27A:
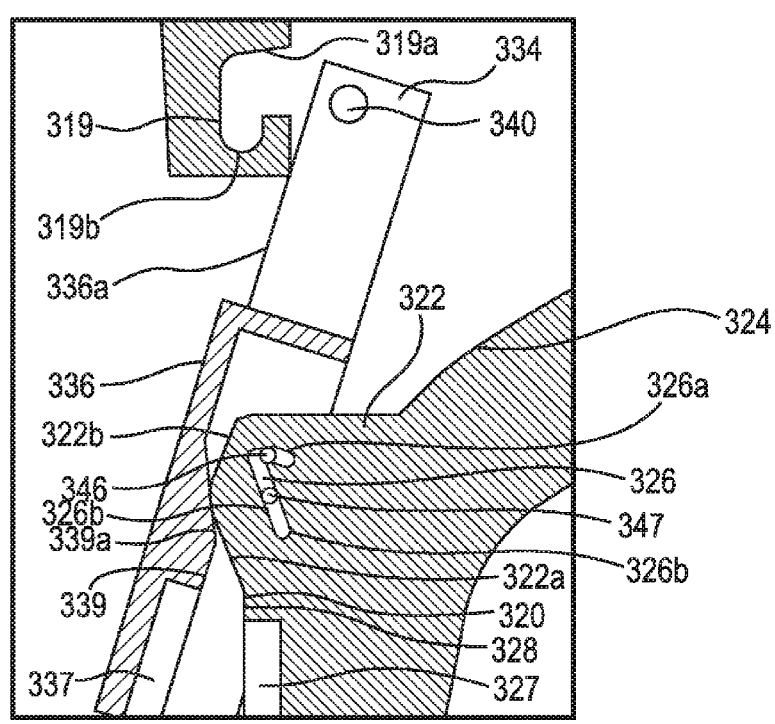

FIGS. 27 and 27A depict the rotational movement of closure 330 relative to hook body 312 when bridge 340 is moved out of j-hook 319. As closure 330 continues to be pushed upward in the direction of arrow A, second closure end 334 contacts and slides along sliding surface 319a. The angle of sliding surface 319a causes second closure end 334 to rotate away from j-hook 319 as indicated by arrow B. This rotation causes first pin 346 to slide into slot leg 326a while simultaneously closure 330 rotates around second pin 347. Sloping channel 339a pivots or rotates around the distal end of oblique portion 322a (the end farthest from magnet 327). This movement further separates magnets 337 and 327.

Figure 28:
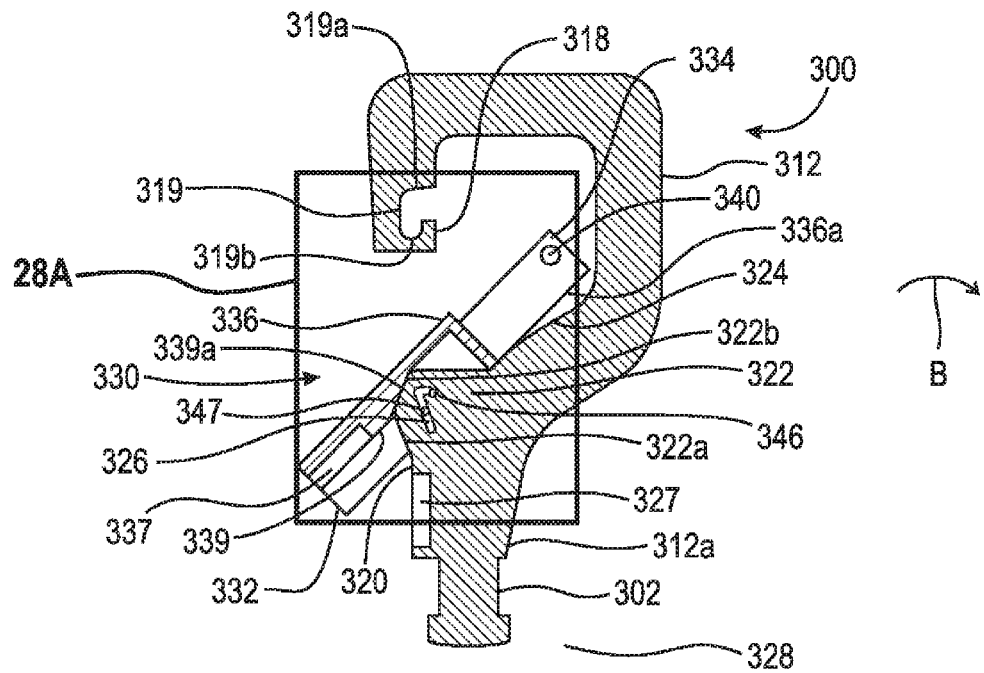
Figure 28A:
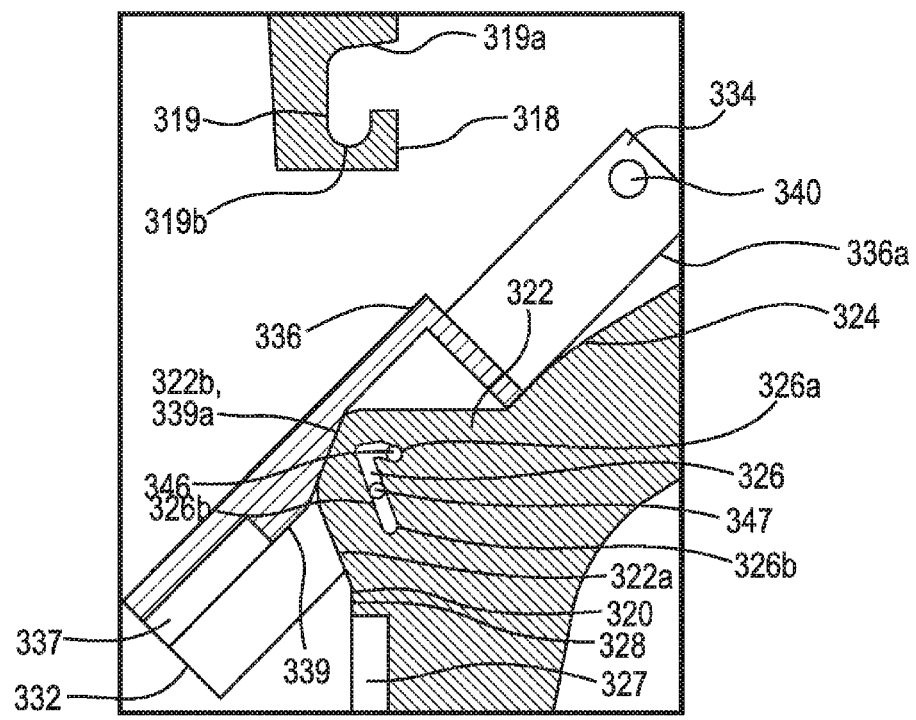

FIGS. 28 and 28A depict the position of closure 330 relative to hook body 312 when closure 330 is completely opened. First pin 346 slides along slot leg 326a toward angled portion 324 of flange 322. Preferably, slot leg 326a has been sized to have pin 346 contacting the end of slot leg 326a. Sloping channel 339a rests against second oblique portion 322b, while leg 336a rests against angled portion 324 of flange 322. When closure 330 is released, it will reverse the movements described above to move back to the closed position seen in FIGS. 24 and 24A.

The above described contact surfaces for closure 330 and flange 322 provide the advantage of supplying the user with stable surfaces for holding closure 330 in the open position while an object is placed in or removed from defined area 350. In addition, the rotatable attachment of closure 330 to second pin 347 has the advantage of providing greater stability to closure 330 when it is held in the open position as closure 330 can rotate around pin 347 while pin 347 is held within slot leg 326b thereby reducing or eliminating any lateral movement of closure 330 when it is being held open. Also, persons of skill in the art will realize that the presence of second pin 347 will diminish or remove the lateral movement of closure 330 when it moves to the closed position as pin 347 is confined to slot leg 326b. Upon release of closure 330, this enables first closure end 332 to rotate such that closure magnet 337 contacts hook magnet 327 without the need for additional adjustment after the closing movement is completed.

Preferably, hook 300 is configured such that center ridge 320 fits into channel 339 between lateral sides 336 and 338 and hook magnet 327 is opposite from and contacting closure magnet 337. This configuration provides the advantage of protecting the magnets or alternatively, one magnet and opposing ferromagnetic material from such elements such as rain, dust, mud, etc.

Thus it is seen that the objects of the invention are efficiently obtained, although changes and modifications to the invention should be readily apparent to those having ordinary skill in the art, which changes would not depart from the spirit and scope of the invention as claimed.

I claim:

1. A hook comprising:
   a body formed into a hook shape and fabricated from nonferromagnetic material, said body having a first hook end and a second hook end, a neck, and an angled portion, wherein said neck is proximate to said first hook end;
   a center ridge extending along one side of said neck, one end of said ridge forming a flange that reaches to said angled portion, said center ridge having a flat top surface;
   an angled slot defined by said flange and having a two slot legs;
   a closure having a first closure end and a second closure end and a first lateral side and a second lateral side, each lateral side extending the length of said closure;
   a channel having a floor and extending at least partly between the lengths of said first lateral side and said second lateral side;
   at least one pin rotatably attached to said first and second lateral sides;
   a bridge proximate to said second closure end and attached to said first and second lateral sides; and
   at least one first magnet attached to either said top surface of said center ridge proximate to said first hook end or said floor of said channel proximate said first closure end,
   wherein said at least one pin is slidably engaged with said slot, and said hook encloses a defined area in a closed position.

2. The hook as recited in claim 1 wherein said at least one pin is two pins.

3. The hook as recited in claim 2 further comprising a ferromagnetic material attached to said hook and positioned to contact said at least one first magnet in a closed position.

4. The hook as recited in claim 1 further comprising at least one second magnet attached to said hook and positioned to contact said at least one first magnet in a closed position.

5. The hook as recited in claim 4 further comprising at least one second magnet attached to said hook and positioned to contact said at least one first magnet in a closed position.

6. The hook as recited in claim 1 further comprising a ferromagnetic material attached to said hook and positioned to contact said at least one first magnet in a closed position.

7. The hook as recited in claim 1 wherein said second hook end is formed into a j-hook.

8. The hook as recited in claim 7 wherein said bridge engages said j-hook in said closed position.

9. The hook as recited in claim 7 wherein said second hook end includes a notch when said hook is in said closed position.

10. The hook as recited in claim 7 wherein said j-hook includes a sliding surface opposite said second closure end.

11. The hook as recited in claim 1 further comprising a traction surface on said closure.

12. The hook as recited in claim 1 wherein said flange includes at least one oblique surface.

13. The hook as recited in claim 1 configured such that said center ridge fits into said channel between said first lateral side and said second lateral side.

14. The hook as recited in claim 1 wherein said floor of said channel includes a sloping surface.

15. The hook as recited in claim 1 wherein said two slot legs are unequal in length.

16. The hook as recited in claim 1 wherein said two slot legs are joined to form an acute angle.

* * * * *